US006181652B1

(12) United States Patent
Katou et al.

(10) Patent No.: US 6,181,652 B1
(45) Date of Patent: Jan. 30, 2001

(54) METHOD AND APPARATUS FOR READING CD-ROMS OR THE LIKE AT MATCHING SPEEDS DETERMINED BY DISK ECCENTRICITIES

(75) Inventors: Noriyuki Katou, Tokyo; Junichi Kanenaga, Tokorozawa; Shigeru Fukinuki, Kokubunji, all of (JP)

(73) Assignee: TEAC Corporation, Tokyo (JP)

( * ) Notice: Under 35 U.S.C. 154(b), the term of this patent shall be extended for 0 days.

(21) Appl. No.: 09/177,024

(22) Filed: Oct. 22, 1998

(30) Foreign Application Priority Data

Oct. 22, 1997 (JP) ........................................ 9-307870

(51) Int. Cl.[7] ........................................ G11B 7/09

(52) U.S. Cl. .............................. 369/44.32; 369/44.26; 369/44.28; 369/54

(58) Field of Search .............................. 369/44.26, 44.27, 369/44.28, 44.29, 44.32, 44.33, 44.34, 54, 58, 59, 47

(56) References Cited

U.S. PATENT DOCUMENTS 5,566,148 * 10/1996 Takahara et al. ...................... 369/42
5,933,397 * 8/1999 Yamashita et al. ............... 369/44.28
6,118,739 * 9/2000 Kishinami et al. ............... 369/44.28

* cited by examiner

*Primary Examiner*—Muhammad Edun
(74) *Attorney, Agent, or Firm*—Woodcock Washburn Kurtz Mackiewicz & Norris LLP

(57) ABSTRACT

A CD-ROM drive is disclosed which is for use with disks having various degrees of spindle hole eccentricity and data track eccentricity. The hole eccentricity of each disk manifests itself during disk rotation as periodic vibration of the disk and, in consequence, periodic departures of the light beam spot from the track to an extent proportional to the speed of disk rotation, whereas the track eccentricity manifests itself during disk rotation as periodic departures of the beam spot from the track to a constant extent regardless of the speed of disk rotation. Therefore, on being loaded into the disk drive, each disk has its hole eccentricity and track eccentricity measured at two different disk eccentricity check speeds in terms of, for example, the amplitude of an eccentricity-caused periodic component of a tracking error signal. The hole eccentricity of the disk is ascertainable by subtracting the eccentricity measurement at the lower check speed from that at the higher check speed. A speed suitable for reading the disk, at which speed the disk will cause no inconvenient vibration, is determined on the basis of the thus ascertained hole eccentricity thereof.

18 Claims, 12 Drawing Sheets

METHOD AND APPARATUS FOR READING CD-ROMS OR THE LIKE AT MATCHING SPEEDS DETERMINED BY DISK ECCENTRICITIES

BACKGROUND OF THE INVENTION

This invention relates to the recovery of data from rotating data storage disks such as, typically, compact disks (CDs) used as read-only memories (ROMs) in computer systems. More specifically, the invention concerns how to determine the optimum speed of rotation for reading each CD-ROM or like data storage disk according to the particular eccentricity of that disk.

Although originally developed for consumer audio reproduction in substitution for analog phonograph records, CDs have now found wide-spread commercial acceptance as compact, high-speed, large-capacity ROMs for computers. The only difference of CD-ROMs from audio CDs is that CD-ROMS are driven at speeds several times as high as the standard audio CD speed (1.2–1.4 meters per second).

There have been problems left unsolved in use of CD-ROMs with high-speed CD-ROM drives in computer systems. CD-ROMs are presently being made under the same design specifications and manufacturing standards as low-speed audio CDs. Inevitably, therefore, a substantial percentage of CD-ROMs on the market are not of truly satisfactory quality for use as high-speed computer data storage media. Some have their spindle holes cut eccentrically; others have their multiturn spiral tracks not centered at the geometric center of the disk.

Such eccentric disks, particularly eccentric hole disks, are easy to vibrate when driven at a speed as high as, say, twenty times the standard audio CD speed. The disk vibration can be resolved into horizontal and vertical components, it being understood that the disk is laid horizontally. The horizontal component can overload the tracking servo of the CD-ROM drive whereby the radial position of the beam spot on the disk is maintained in alignment with the spiral data track. The overloading of the tracking servo has resulted in the overheating of the voice-coil actuator for tracking control, in the degradation of its performance and, in the worst case, in the burning of the actuator coil.

The vertical component of disk vibration, on the other hand, can cause the overloading of the beam focusing servo of the CD-ROM drive, again resulting in the overheating of the focusing actuator of voice-coil construction, in the degradation of its performance and, in the worst case, in the burning of the focusing actuator coil. The malfunctioning, not to mention total destruction, of the tracking or the focusing servo must be averted by any means because of ensuing read errors and retries, which is a waste of time running counter to the objective of high speed data recovery for which CD-ROMs are intended.

Disk vibration can give rise to additional inconveniences. A vibrating disk may cause vibration of the complete CD-ROM drive and, in consequence, of the hard disk drive (HDD) in particular which is currently being preferentially built into the computer system along with the CD-ROM drive. The vibration of the HDD is just as undesirable, causing both read and write errors, to the detriment of the reliability of the complete computer system. Even if not so excessive as to cause read and write errors, the vibration of the CD-ROM drive certainly gives a shoddy image of the product to the user or to prospective buyers.

The reader might think that all such troubles and inconveniences would not manifest themselves if only high quality CD-ROMs, altogether free from the physical defects pointed out earlier, were used. CD-ROM drive manufacturers cannot, and should not, expect their products to be used only with such high quality disks, since in the current state of affairs the existence of poor quality CD-ROMs must be more or less taken for granted.

Fujimoto et. al. U.S. patent application Ser. No. 08/890,924, filed Jul. 10, 1997, teaches to check the eccentricity of each CD-ROM loaded into the disk drive and to read the disk at a speed matching its particular eccentricity. The maximum possible reading speed according to this prior related application is assumed to be eight times the standard audio CD speed. More recently, however, CD-ROMs have begun to be read at as high as twenty or even thirty times the standard audio CD speed. The higher the speed of rotation, the more will the disk vibrate if it is eccentric. A more accurate determination of the amount, and "nature", as will be later explained, of the eccentricity of each disk has proved necessary for reading only high quality disks at such ultrahigh speeds, and other disks at less speeds matching their particular eccentricities.

SUMMARY OF THE INVENTION

The present invention has it as an object to ascertain the amount and nature of the eccentricity of each disk more accurately than heretofore and to drive the disk at a speed suiting the particular eccentricity of the disk.

Another object of the invention is to recover data from disks of varying physical qualities at the highest possible speed suiting each particular disk without causing read errors or retries.

Still another object of the invention is to make utmost use of the preexisting parts and components of CD-ROM drives or like apparatus in order that the inventive concepts may be implemented in such apparatus without any substantial alteration of its construction.

Briefly summarized in one aspect thereof, the present invention concerns, in an apparatus for data recovery from rotating data storage disks having varying degrees of hole eccentricity and track eccentricity, a method of reading each disk at a speed suiting the particular hole eccentricity of that disk. The method comprises making a first measurement of the hole eccentricity and track eccentricity of a disk in rotation at a first disk eccentricity check speed, and a second measurement of the hole eccentricity and track eccentricity of the disk in rotation at a second disk eccentricity check speed which is higher than the first. The subtraction of the first measurement from the second measurement provides the hole eccentricity of the disk, according to which a matching speed of rotation for reading the disk is determined.

Stated in another aspect thereof, the present invention provides an apparatus for carrying the foregoing method of this invention into practice. A rotating disk data recovery apparatus, particularly a CD-ROM drive, of standard design is readily adaptable for implementation of the method.

The invention as summarized above is based upon the fact that there are two types of disk eccentricities, namely, hole eccentricity and track eccentricity. Hole eccentricity is such that the spindle hole is situated off the geometric center of the disk. In track eccentricity the data track is not centered at the geometric center of the disk. Usually, both hole eccentricity and track eccentricity coexist in each disk. It is, however, hole eccentricity that causes vibration of the disk and of the disk drive upon rotation of the disk, with the intensity or amplitude of vibration increasing with disk speed. Track eccentricity, on the other hand, is no inherent cause of disk vibration, and the vibration of a disk having only track eccentricity, if any, does not increase in intensity with disk speed.

Thus the present invention advocates to measure the hole eccentricity and track eccentricity of each disk at two different disk speeds. The subtraction of the eccentricity measurement at the lower disk speed from that at the higher results in the elimination of the track eccentricity, leaving only the hole eccentricity. The hole eccentricity thus detected is solely relied upon in determination of the speed for reading the disk with a minimum of vibration and therefore a minimum of read errors and retries.

The invention is particularly well applicable to optical disk drive as typified by CD-ROM drives, such devices having a transducer for reading data recorded on each optical disk along a multiturn spiral track thereon by irradiating the disk with a beam of light. The hole eccentricity of an optical disk manifests itself during disk rotation as periodic vibration of the disk and, in consequence, periodic departures of the light beam from the track to an extent proportional to the speed of disk rotation. The track eccentricity manifests itself during disk rotation as periodic departures of the light beam from the track to a constant extent regardless of the speed of disk rotation.

In optical disk drives, therefore, the hole eccentricity and track eccentricity of each disk are measurable from a tracking error signal or a tracking actuator drive signal, since these signals both include a component indicative of periodic departures of the light beam from the track. The tracking error signal and the tracking actuator drive signal may be utilized either individually or in combination for eccentricity measurement. Either way the eccentricity measurement from these signals is preferred to, for instance, the provision of an eccentricity or vibration sensor because the signals are both produced by parts of the standard tracking servo incorporated in optical disk drives.

Optical disk drives have an additional source from which eccentricity measurement is possible according to this invention. That source is transducer output pulses each produced as the light beam crosses a track turn. With the tracking servo turned off, the first and the second measurements of the hole eccentricity and track eccentricity are made by counting the transducer output pulses during at least one complete revolution of the disk at the first and the second eccentricity check speeds, respectively. The hole eccentricity of the disk is obtained by subtracting the first measurement from the second. The counting of transducer output pulses is also recommenced as it dispenses with an eccentricity or vibration sensor.

The above and other objects, features and advantages of this invention and the manner of realizing them will become more apparent, and the invention itself will best be understood, from a study of the following description and appended claims, with reference had to the attached drawings showing some preferred embodiments of the invention.

DESCRIPTION OF THE PREFERRED EMBODIMENTS

Apparatus

Figure 1:
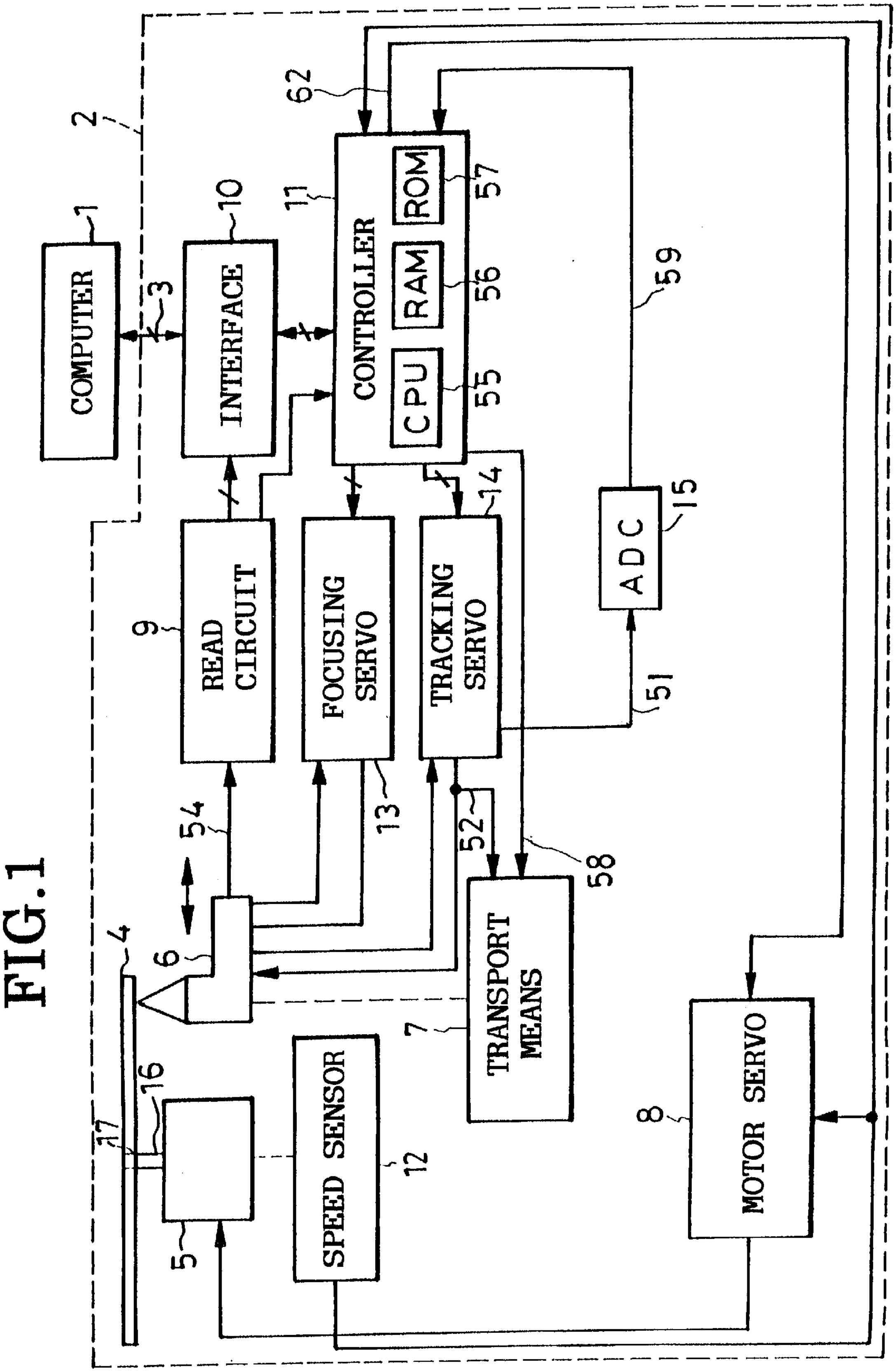
FIG. 1 is a block diagram of the CD-ROM drive constructed in accordance with the novel concepts of this invention for carrying out the disk eccentricity check method, the CD-ROM drive being shown together with a computer with which it is incorporated.

The present invention is believed to be best embodied in the computer system diagramed in FIG. 1, which shows a computer 1 connected to a CD-ROM drive 2 by way of a bus 3. The CD-ROM drive 2 is shown loaded with a CD-ROM or optical data storage disk 4. The CD-ROM 4 will be hereinafter referred to as the disk, and the CD-ROM drive 2 as the disk drive, for simplicity. The disk 4 is shown disposed in a preassigned data recovery position by receiving in its center hole 17 a drive spindle 16 shown as an armature shaft of an electric disk drive motor 5. As far as the present invention is concerned, the disk 4 is "loaded" in the disk drive 2 when it is on the drive spindle 16, as pictured in FIG. 1, and "unloaded" when it is moved out of engagement with the drive spindle.

Other primary components of the disk drive 2 include an optoelectric transducer or pickup 6, a transducer transport means 7, a disk drive motor servo circuit 8, a read circuit 9, an interface circuit 10, a system controller 11 which may take the form of a microprocessor or digital signal processor, a disk drive motor speed sensor 12, a focusing servo circuit 13, a tracking servo circuit 14, and an analog to digital converter (ADC) 15 for use in detection of the eccentricity of each loaded disk 4 according to this invention.

Figure 2:
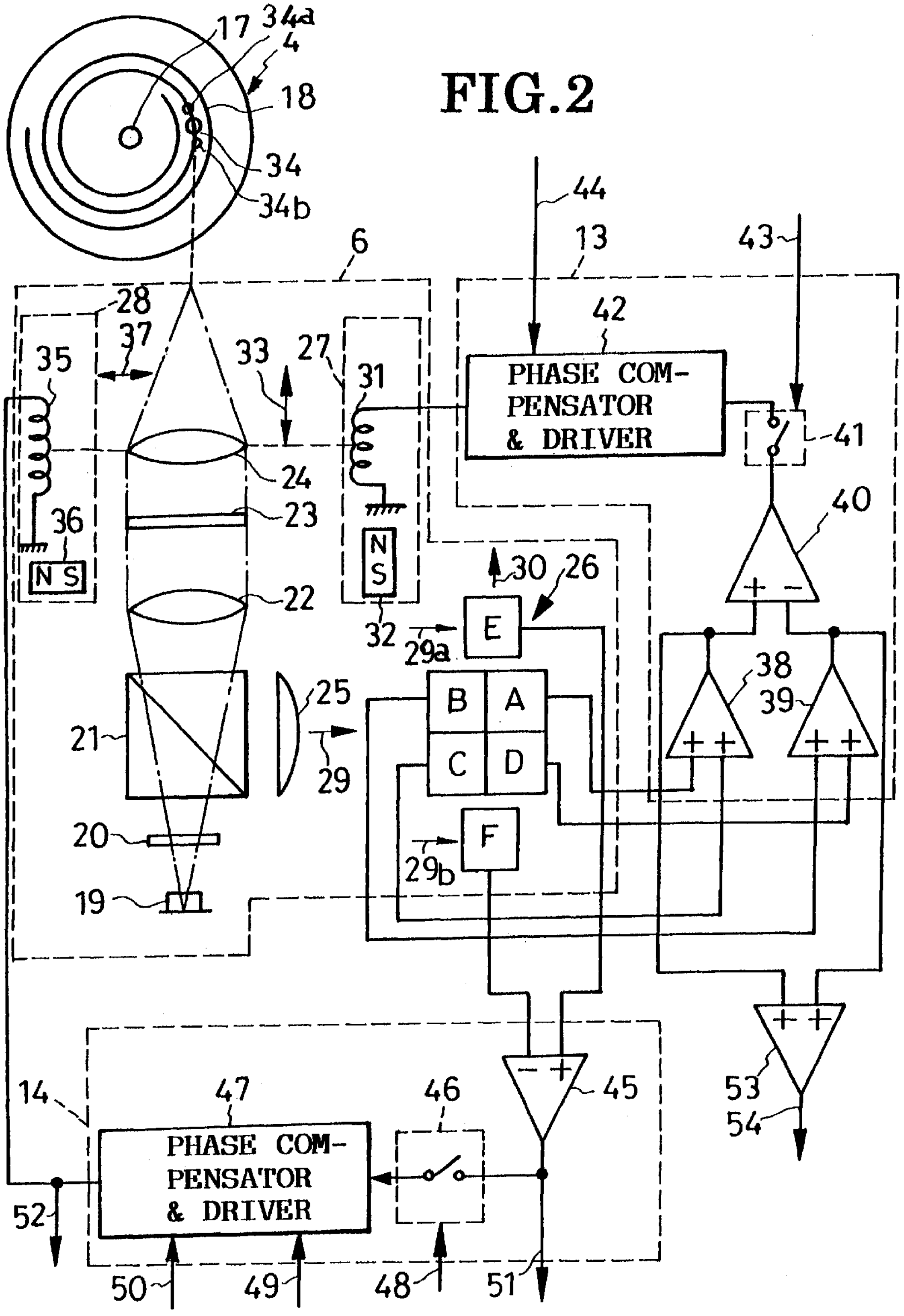
FIG. 2 is a schematic electrical diagram showing in more detail the transducer, tracking servo circuit, and focusing servo circuit of the FIG. 1 CD-ROM drive.

As depicted diagrammatically in FIG. 2, the disk 4 can be of the standard CD-ROM design having data prerecorded thereon in the form of minute bumps or pits impressed into the disk surface along a multiturn spiral track 18. Ideally, the data track 18 is centered about the spindle hole 17, and this spindle hole is at the geometric center of the disk. Practically, however, the data track may not be centered about the spindle hole or about the geometric center of the disk, and the spindle hole may not be centered on the disk. The present invention seeks to find the speed of rotation matching the hole eccentricity, rather than the track eccentricity, of each disk. More will be said presently about such track eccentricity and hole eccentricity.

In CD-ROMs, as in audio CDs, the current practice is to record data at constant linear velocity (CLV), rather than at constant angular velocity (CAV), and to read the data at either CLV or CAV. For CLV reading of the disk the angular velocity of the disk is increased as the disk track is scanned radially outwardly by the transducer.

As shown in detail also in FIG. 2, the transducer 6 is of prior art construction having a light source such as a diode laser 19, a diffraction grating 20, a beam splitter 21, a collimator lens 22 for providing parallel rays of light, a quarter wavelength plate 23, an objective lens 24, a semicylindrical lens 25 disposed on the path of the light that has been reflected back from the disk 4 and subsequently separated from the incident light by the beam splitter 21, a photodetector 26, a focusing actuator 27, and a tracking actuator 28.

Converged by the objective 24, the light from the laser 19 hits the surface of the disk 4. It Is understood that in the Illustrated transducer 6, the diffraction grating 20 creates a primary beam, used for both reading and focusing control, and two auxiliary beams for tracking control. FIG. 2 shows only the primary beam spot on the disk 4 at 34, and the two auxiliary beam spots at 34*a* and 34*b*. The unmodulated primary beam on hitting the disk surface will be modulated by the pattern of optical pits representative of data, and this modulated primary beam, as well as the reflected auxiliary beams, will be directed by the beam splitter 21 into the photodetector 26 via the semicylindrical lens 29. The arrow designated indicates the reflected primary beam thus irradiating the photodetector 26, and the arrows 29*a* and 29*b* the two reflected auxiliary beams for tracking control purposes.

Capable of translating the incident light beams into electric signals, the photodetector 26 is shown to have a closely packed group of four photosensitive sections designated A, B, C and D, both for data recovery and for focusing control, and two other separate photosensitive sections E and F for tracking control. The photodetector sections A and B, as well as the sections C and D, are divided along a line extending essentially tangentially of the disk track 18, as indicated by the arrow 30. The other two photodetector sections E and F are aligned in the direction of the arrow 30. The reflected primary beam 29 irradiates the sections A-D, and the reflected auxiliary beams 29*a* and 29*b* the sections E and F, respectively.

The focusing actuator 27 is shown as a voice coil actuator comprising a moving coil 31 coupled to the objective 24, and a permanent magnet 32. The objective 24 moves back and forth perpendicular to the disk surface, as indicated by the double headed arrow 33, in response to bidirectional current flow through the moving coil 31. The beams will thus be kept focused on the disk surface.

The tracking actuator 28, which functions to maintain the read beam spot 34 in centerline alignment with the disk track 18, is also shown as being of voice coil construction comprising a moving coil 35 coupled to the objective 26, and a permanent magnet 36. The objective 26 moves back and forth parallel to the disk surface, as indicated by the double headed arrow 37, in response to bidirectional current flow through the moving coil 35. The tracking actuator 28 serves the additional purpose of jumping the beam spot to a desired track position during seek operations. Such spot jumping will take place as a jumping signal is applied from the system controller 11, FIG. 1, to the moving coil 35 via the tracking servo circuit 14.

The four photodetector sections A–D are all connected to the focusing servo circuit 13 and thence both to the moving coil 31 of the focusing actuator 27 and, via an adder 53, to the read circuit 9, FIG. 1. The focusing servo circuit 18 comprises two adders 38 and 39, a subtracter 40, an on-off switch 41, and a phase compensator and driver circuit 42. The adder 38 adds the outputs from the photodetector sections A and C; and the other adder 39 the outputs from the photodetector sections B and D. The subtracter 40 subtracts the output from the adder 39 from the output from the adder 38. The resulting output from the subtracter 40 is a focusing control signal, which is applied via the switch 41 and phase compensator and driver circuit 42 to the moving coil 31 of the focusing actuator 27. The objective 24 will thus be moved toward or away from the disk surface to keep the read beam focused thereon.

The focusing method set forth above is known to the specialists as the astigmatic method. The switch 41 is operated by a signal supplied from the system controller 11 over a conductor 43, and the phase compensator and driver circuit 42 by a signal supplied from the system controller over a conductor 44.

The noted two photodetector sections E and F are both connected to the tracking servo circuit 14 and thence to the moving coil 35 of the tracking actuator 28. The tracking servo circuit 14 comprises a subtracter 45, an on-off switch 46, and a phase compensator and driver circuit 47. The subtracter 45 subtracts the output from the photodetector section F from the output from the photodetector section E The resulting output from the subtracter 45 is a tracking error signal, which is applied via the switch 46 and phase compensator and driver circuit 47 to the moving coil 35 of the tracking actuator 28, thereby causing the objective 24 to move parallel to the disk surface to keep the read beam spot 34 in centerline alignment with the disk track 18.

The above described method of tracking control is per se not new in the art but has been known to the specialists as the three spots method. Another possible method is the differential phase detection, also conventional in the art, which creates a tracking error signal based on the difference between the sum of the outputs from the photodetector sections A and C and the sum of the outputs from the photodetector sections B and D, dispensing with the diffraction grating 20 and the photodetector sections E and F.

The switch 46 is turned on and off by a signal supplied from the system controller 11, FIG. 1, over a conductor 48. The phase compensator and driver circuit 47 includes phase compensation filter means and gain control means, both not shown, which are controlled by a signal fed from the system controller 11 over a conductor 49. The aforesaid jumping pulses are supplied over another conductor 50 to the driver section of the circuit 47. The three input conductors 48, 49 and 50 of the tracking servo circuit 14 are shown as a single line in FIG. 1 for simplicity of illustration. An output conductor 51 shown extending from the subtracter 45 of the tracking servo circuit 14 is intended for delivery of the tracking error signal to the system controller 11 via the ADC 15, enabling the system controller to detect disk eccentricity according to the present invention. The output from the tracking servo circuit 14 is applied not only to the tracking actuator 28 but also to the transducer transport means 7, FIG. 1, by way of a conductor 52 in order to enable the transducer 6 to trace the spiral track on the disk 4.

It is apparent that the addition of all the outputs from the photodetector sections A–D provides a read signal representative of the data read out from the disk 4. The illustrated embodiment employs the adder 53 for adding together the outputs from the two adders 38 and 39 of the focusing servo circuit 13, although, of course, the outputs from the photodetector sections A–D could be directly added together. The read signal thus obtained is sent over the conductor 54 to the FIG. 1 read circuit 9.

In FIG. 1 the connections between the transducer 6, read circuit 9, focusing servo circuit 13, and tracking servo circuit 14 are shown greatly simplified and so do not exactly reflect the connections indicated in FIG. 2. Also, in FIG. 2, all or some of the adders 38, 39, and 53 and subtracters 40 and 45 could form parts of the transducer 6, that is, could be made movable with the optical reading system across the data tracks 18 on the disk 14.

The transducer 6 is moved across the turns of the track 18 on the disk 4 by the transport means 7 typically comprising an electric motor and means such as a lead screw or a rack and pinion mechanism for translating the bidirectional rotation of the motor into the linear reciprocation of the transducer 6. The transport means 7 have two functions: (1) to move the transducer 6 to desired track positions on the disk 4 in response to a seek command sent from the system controller 11 over a conductor 58; and (2) to enable the transducer to trace the spiral track on the disk in cooperation with the disk drive motor 5. For this latter function the transport means 7 detects the radial displacement of the beam spot 35 from the track 18 by directing into a low pass filter, not shown, the tracking control signal fed from the tracking servo circuit 14 over the conductor 52, and controls the radial travel of the transducer 6 accordingly.

Connected to the disk drive motor 5, controller 11, and motor speed sensor 12, the motor servo circuit 8 controls the motor for rotation at the speed indicated by the controller. For CLV reading of data that has been CLV recorded on the disk, the motor servo circuit 8 conventionally operates to vary the rotational speed of the motor according to the radial position of the read beam on the disk 4. The motor servo circuit 8 is also conventionally equipped to drive the motor at a constant speed for CAV reading.

The read circuit 9 is connected as aforesaid to the conductor 54 for inputting the data that has been recovered from the disk 4. Conventionally comprising a wave shaping circuit, synchronization detector circuit, demodulator circuit, error detection and correction circuit, etc., the read circuit 9 processes the input signal accordingly and puts out a data signal in a form suitable for delivery to the computer 1 via the interface 10.

The system controller 11 is shown in FIG. 1 as comprising a central processor unit (CPU) 55, a random access memory (RAM) 56 and a read only memory (ROM) 57. The controller 11 has outputs connected to the transducer transport means 7, the disk drive motor servo circuit 8, the focusing servo circuit 13, and the tracking servo circuit 14 for conventionally controlling them in order to retrieve data from the disk 4 as dictated by commands from the computer 1. Additionally, the controller 11 is equipped to ascertain the eccentricity of each loaded disk and to determine the matching speed of rotation for that disk accordingly, as will be detailed hereafter.

Disk eccentricity is measured according to this invention by driving the disk at two different speeds, both less than the maximum possible speed of the disk drive motor 5, and by taking advantage of a signal used in the standard tracking control of the transducer 6. The two different speeds at which the disk is driven for disk eccentricity measurement will be hereinafter referred to as the disk eccentricity check speeds, simply as the disk check speeds, or more simply as the check speeds. If eccentric, the disk 4 on rotation will itself vibrate mechanically and so cause vibration of the disk drive motor 4 and the transducer 6, among other parts. Such vibration resolves itself into a "vertical" component (i.e. component in the direction in which the drive spindle 16 extends) and a "horizontal" component at right angles with the vertical component. It is the horizontal component that causes deviations of the read beam spot 34 and two tracking beam spots 34*a* and 34*b* out of centerline alignment with the track 18 on the disk 14. Such deviations, commonly referred to as tracking errors, are therefore a measure of disk eccentricity.

Tracking errors are represented by the output from the subtracter 45, FIG. 2, of the tracking servo circuit 14. The tracking errors as represented by the tracking error signal from the subtracter 45, however, are only partly due, and partly not due, to disk vibration caused by disk eccentricity. But, luckily, tracking errors due to disk eccentricity are clearly distinguishable from those not due to that cause because the former have a periodicity that is coincident with each complete revolution of the disk.

Thus the present invention advocates to measure disk eccentricity by deriving the horizontal component of disk vibration due to disk eccentricity from the tracking error signal produced by the subtracter 45. Toward this end the ADC 15, FIG. 1, is connected to the output conduc3 tor 51 of the subtracter 45 for digitizing the tracking error signal preparatory to delivery to the system controller 11 over a conductor 59.

Figure 3:
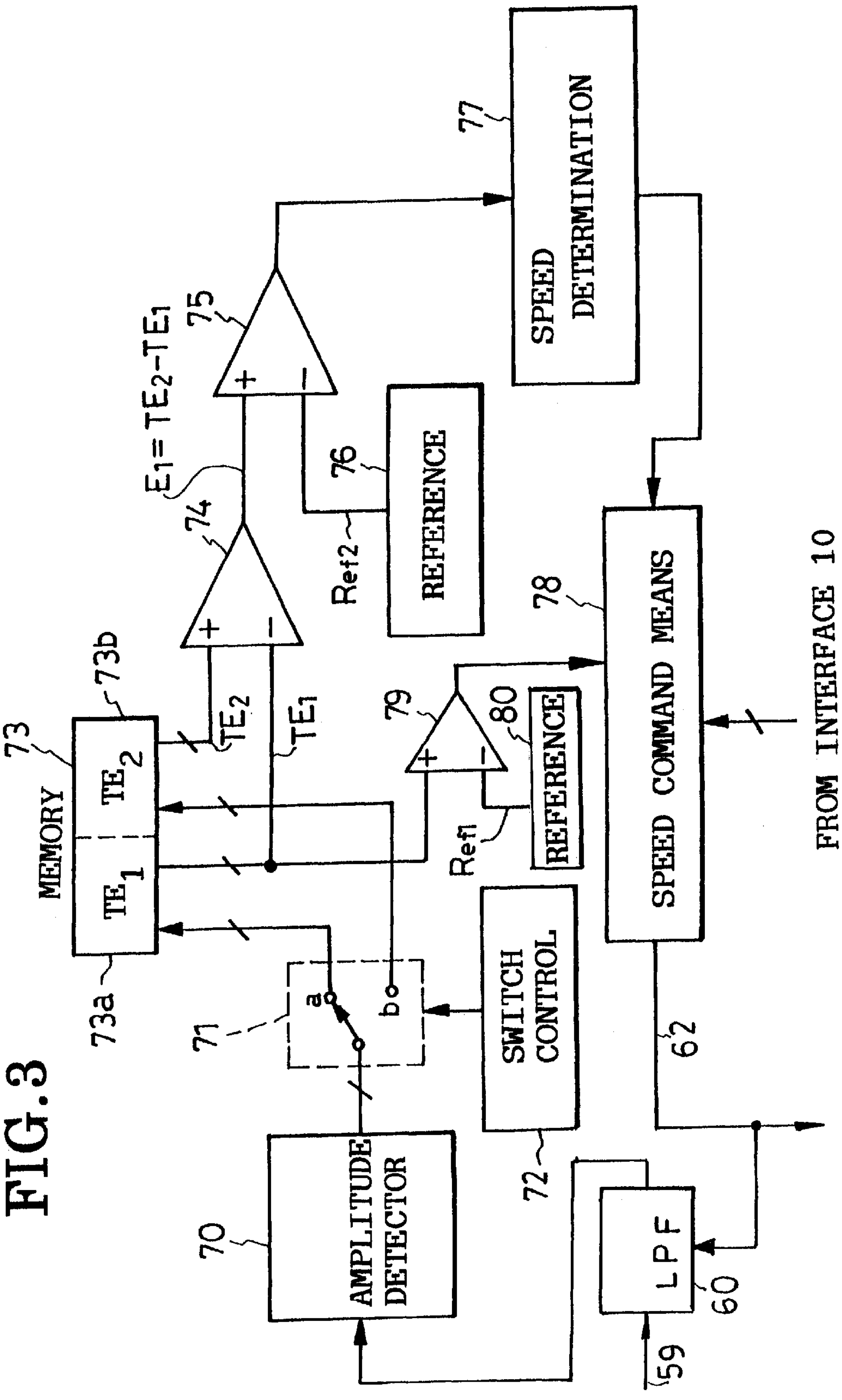
FIG. 3 is an equivalent block diagram of the system controller included In the FIG. 1 CD-ROM drive, showing in particular the means possessed by the controller for implementation of the disk eccentricity check method according to the invention.

FIG. 3 is a schematic illustration of various means built into the controller 11 for deriving the eccentricity component from the incoming digital tracking error signal, for measuring the disk eccentricity, and for determining the speed at which that disk is to be read according to the measurement. The input conductor 59 is connected, first of all, to a digital lowpass filter 60 which functions to derive from the tracking error signal the periodic vibration component that varies with revolutions of the disk. Since disk eccentricity is measured at two different check speeds as aforesaid, the cutoff frequency of the LPF 60 must be varied as the disk speed is changed from one to the other. To this end the LPF 60 has an input connected by way of a conductor 62 to speed command means 78, which is also connected to the disk drive motor servo circuit 8, FIG. 1, to cause disk rotation at either of the two disk eccentricity check speeds or at any chosen read speed.

Figure 4:
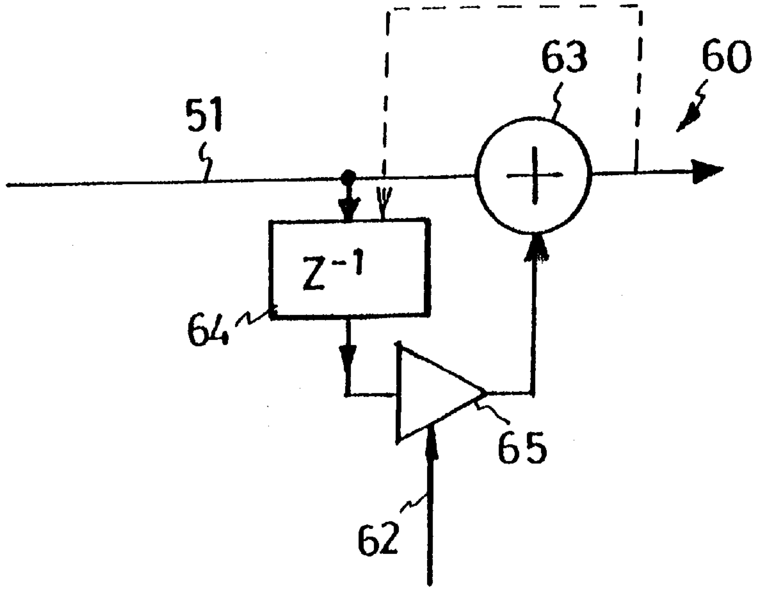
FIG. 4 is a schematic electrical diagram showing the lowpass filter of the FIG. 3 system controller in more detail.

As depicted highly schematically in FIG. 4, the digital LPF 60 may be envisaged as comprising an adder 63, a sample delay circuit 64, and a coefficient unit or multiplier 65, which are connected as shown. The adder 63 adds the digitized tracking error signal and its delayed signal. This construction permits a variety of modifications, however. For example, there may be provided two or more, instead of one, delay stages, or, as indicated by the dashed line, the output from the adder 63 may be input to the delay circuit 64 instead of the tracking error signal. Either way, the cutoff frequency of the LPF 60 may be changed by varying the coefficient of the multiplier 65.

Figure 5:
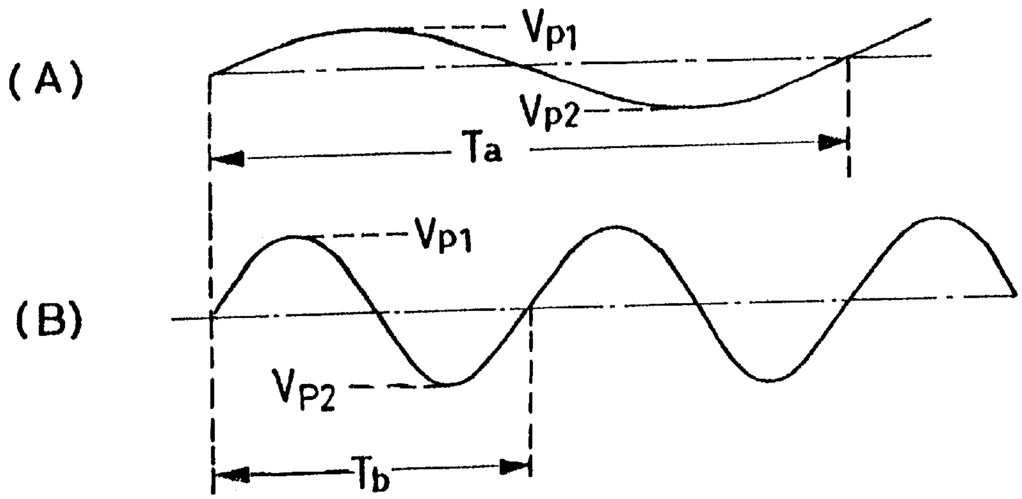
FIG. 5, consisting of (A) and (B), is a waveform diagram showing the track eccentricity components included in the tracking error signal of the FIG. 1 CD-ROM drive when the disk is driven at two different speeds for eccentricity measurement.

Diagramed at (A) and (B) in FIG. 5 are analog equivalents of the outputs (horizontal vibration components) from the LPF 60 when an eccentric disk is driven at the two eccentricity check speeds. The periods Ta and Tb of vibrations in these diagrams correspond to each complete revolution of the disk at the two check speeds. It will be noted that, even though the disk is the same, the amplitude of vibration is greater when the speed of disk rotation is higher, as at (B), than when the speed is lower as at (A).

Figure 6:
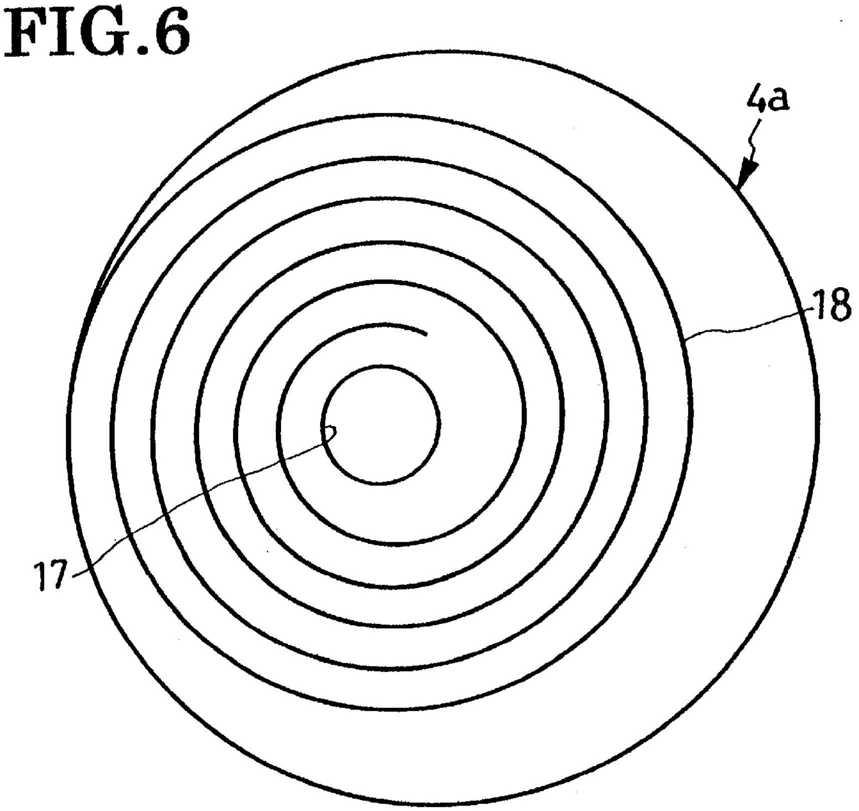
FIG. 6 is a plan view of a CD-ROM having hole eccentricity.
Figure 7:
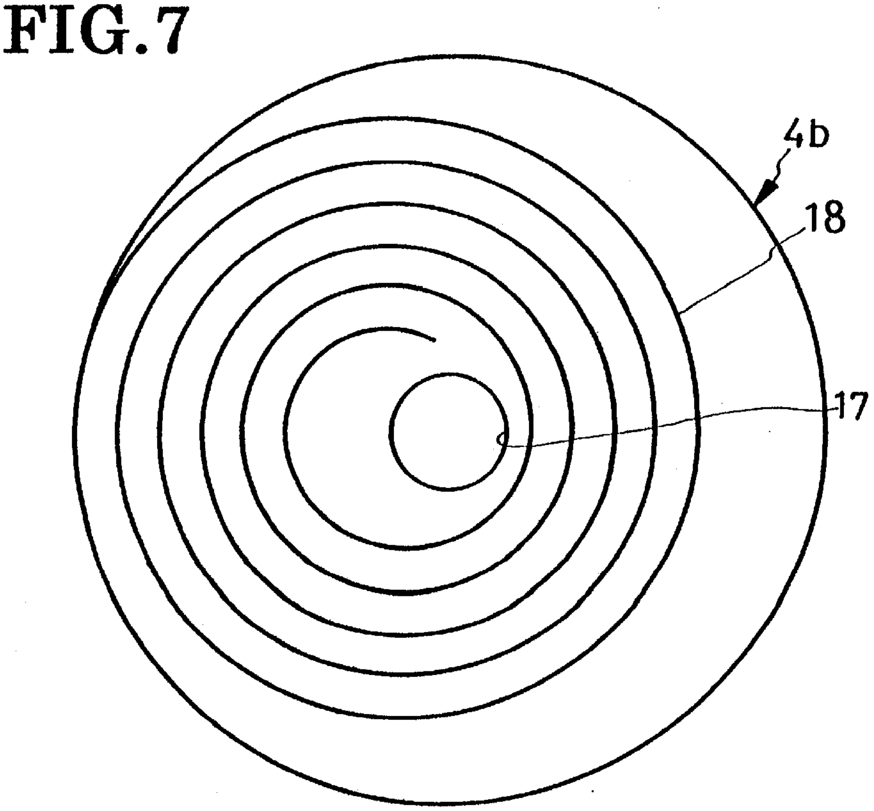
FIG. 7 is a plan view of a CD-ROM having track eccentricity.

Before proceeding further with the description of the FIG. 3 means built into the system controller 11, let us briefly study what exactly is meant by so called "eccentric" disks. Such disks can be broadly classified into two categories. One of them is what is herein called an eccentric hole disk, shown in FIG. 6 and therein labeled 4*a*, having a spindle hole 17 situated off the geometric center of the disk. The other is typified by a FIG. 7 disk 4*b* which has a spindle hole 17 in the right position on the disk but in which the multiturn spiral track 18 is not centered at the geometric center of the disk. Such a disk 4*b* is herein referred to as an eccentric track disk. Of course, in practice, both hole eccentricity and track eccentricity may coexist in one disk; more exactly, most disks may possess both types of eccentricities in various quantities. FIGS. 6 and 7 are meant purely to illustrate the two types of defects, and the defects are, needless to say, shown greatly exaggerated.

The instant invention is based upon the finding that, being dynamically unbalanced about the spindle hole 17, the eccentric hole disk 4*a* vibrates more with an increase in the speed of rotation. causing periodic deviations of the beam spot from the track to extents that are dependent upon the disk speed. The eccentric track disk 4*b*, on the other hand, causes periodic departures of the beam spot from the track as a direct result of its track eccentricity. However, the intensity of vibration, if any, of the eccentric track disk 4*b* is totally independent of the speed of disk rotation, this disk being dynamically balanced about its spindle hole 17. It is therefore necessary to make a clear distinction between hole eccentricity and track eccentricity of any given disk, to accurately measure its hole eccentricity, and to determine the fitting read speed for that disk solely on the basis of the hole eccentricity.

From these considerations the present invention utilizes the aforesaid tracking error signal produced by the subtracter 45, FIG. 2, of the tracking servo circuit 14, for accurate detection and measurement of the hole eccentricity of each loaded disk. The tracking error signal contains both a component representative of hole eccentricity and a component representative of track eccentricity. The hole eccentricity of any disk is detectable by driving the disk at two different check speeds and by eliminating from the tracking error signal the component representative of track eccentricity.

With reference back to FIG. 3 the LPF 60 of the system controller is connected to an amplitude detector circuit 70 which detects the peak amplitude of the output from the LPF, that is, the difference between the positive peak $Vp_1$, FIG. 5, and negative peak $Vp_2$ of the LPF output. In other words, the amplitude detector circuit 70 measures the intensity of periodic vibration of the disk 4 due to both hole eccentricity and track eccentricity.

The output from the amplitude detector 70 is directed through a selector switch 71 to a memory 73. Operating under the direction of a switch control circuit 72, the selector switch 71 functions to send the amplitude detector output to two different parts 73*a* and 73*b* of the memory depending upon whether the disk is being driven at one or the other of the two disk check speeds. Thus, during disk rotation at the first check speed, a first amplitude (i.e. eccentricity) measurement $TE_1$ made by the amplitude detector circuit 70 will be written via the switch contact a on the first part 73*a* of the memory 73. A second amplitude (i.e. eccentricity) measurement $TE_2$ will be written via the switch contact b on the second memory part 73*b* during disk rotation at the second check speed. In practice this memory 73 can be part of the RAM 56, FIG. 1, built into the system controller 11.

A subtracter 74 has its two inputs shown connected to the two parts 73*a* and 73*b* of the memory 73 for computing the hole eccentricity $E_1$ of the disk by subtracting the first eccentricity measurement $TE_1$ from the second $TE_2$; that is, $E_1=TE_2-TE_1$.

The hole eccentricity output $E_1$ from the subtracter 74 is sent into the positive input of a comparator 75, the negative input of which is connected to reference means 76 for inputting a reference value $Ref_2$. The reference means 76 may be part of the ROM 57, FIG. 1. The output from the comparator 75 indicates whether the hole eccentricity $E_1$ is not less than the reference $Ref_2$ or not.

Inputting this output from the comparator 75, the speed determination means 77 determines the speed at which the disk is to be driven, according to whether its hole eccentricity $E_1$ is not less than the reference $Ref_2$ or not. The disk is judged to be of poor quality if the hole eccentricity $E_1$ is equal to or more than the reference $Ref_2$, and of good quality if not. The speed determination means 77 produces a signal indicative of a speed less than the maximum possible speed of rotation of the disk drive motor 5 if the disk has proved to be of poor quality; and of the maximum possible motor speed if the disk has proved to be of good quality.

Instead of the comparator 75, however, another subtracter could be connected between subtracter 74 and speed determination means 77 for speed determination according to the difference between hole eccentricity $E_1$ and reference $Ref_2$. In this case any one of several different speeds (e.g. two, four, eight, sixteen, and twenty times the standard audio CD speed) may be chosen for each disk loaded. As another alternative, the subtracter 74 could be connected directly to the speed determination means 77, causing the latter to determine the disk speed according to the hole eccentricity $E_1$.

The speed determination means 77 informs the aforementioned speed command means 78 of the chosen disk speed. Connected to the disk drive motor servo circuit 8, FIG. 1, by way of 62 conductor, the speed command means 78 causes disk rotation at the chosen speed.

As an ancillary feature of this invention, the FIG. 3 system controller is provided with additional means for determination of the second disk check speed according to the first amplitude measurement $TE_1$. Such means include a comparator 79 having one input connected the first part 73*a* of the memory 73, and reference means 80, such as part of the ROM 57, connected to another Input of the comparator 79.

The comparator 79 causes the speed command means 78 to make the second disk check speed lower when the first eccentricity measurement $TE_1$ proves greater than a reference $Ref_1$.

Method

Figure 8:
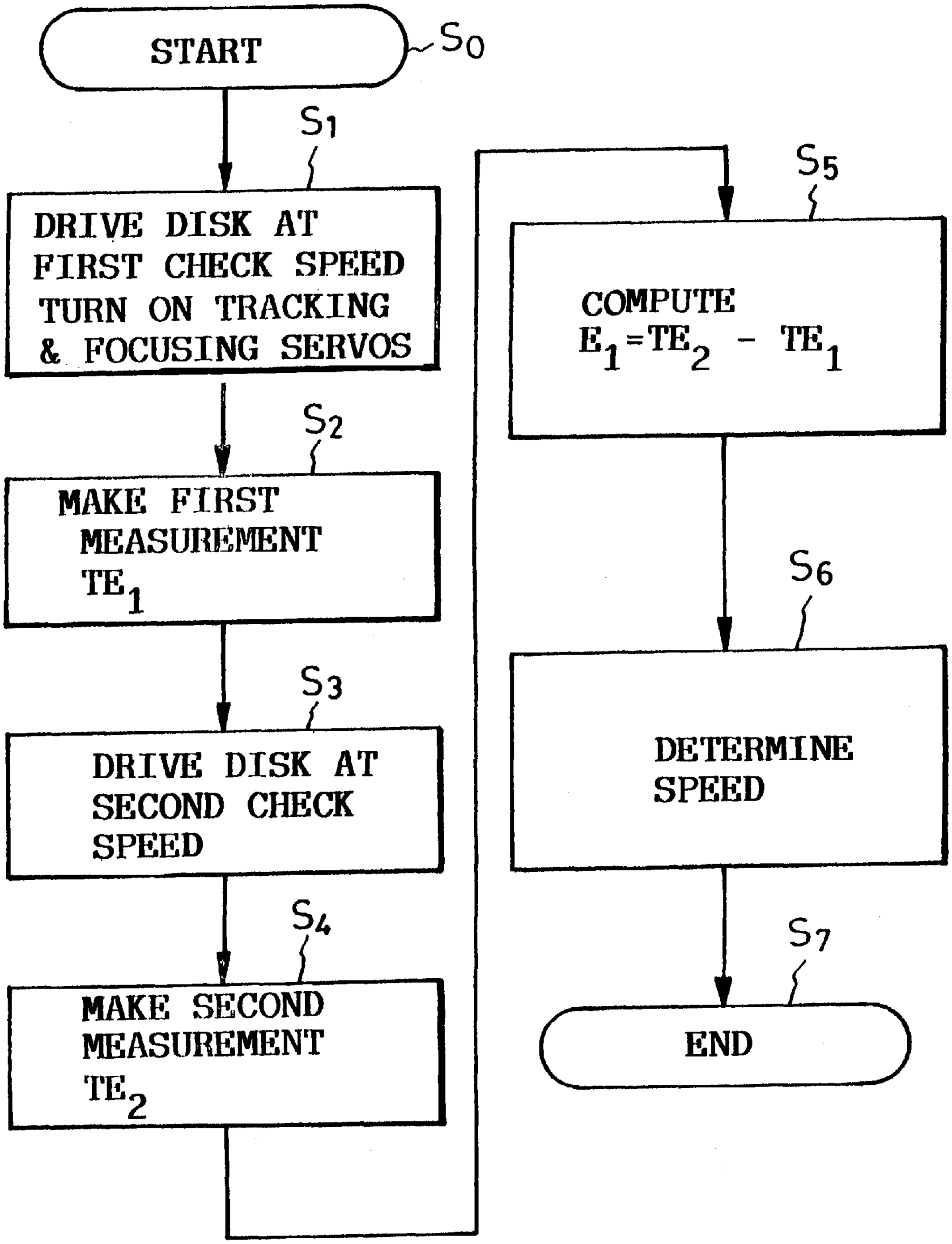
FIG. 8 is a flow chart of the disk eccentricity check program ac5 cording to the present invention, to be executed in the FIG. 1 CD-ROM drive.

Flowcharted in FIG. 8 is the disk eccentricity check routine according to the method of this invention which is to be factory preprogrammed on the ROM 57 of the controller 11. The routine starts at $S_0$ when a CD-ROM disk 4 is loaded on the drive spindle 16. The first block $S_1$ indicates driving of the disk at the first check speed of, say, four times the standard audio CD speed. Further, with both tracking and focusing servos set into operation, the transducer 6 is positioned on the Inmost turn of the data track 18 on the disk 4 where the table of contents is customarily recorded. Experiment has proved that disks of any possible eccentricities are readable at four times the standard audio CD speed (1950 revolutions per minute).

Then the first eccentricity measurement is done according to the block $S_2$. As has been set forth with reference to FIG. 3, the disk eccentricity is measured by the amplitude detector circuit 70, and the first eccentricity measurement $TE_1$ is written on the first part 73*a* of the memory 73.

The next block Ss dictates driving of the disk at a second eccentricity check speed. This second check speed may be predetermined but, as has also been mentioned in connection with FIG. 3, is preferably variously determined according to the first eccentricity measurement $TE_1$ in the illustrated embodiment. The first eccentricity measurement $TE_1$ is compared with the $Ref_1$ by the comparator 79. The second check speed may be set at 50 percent of the maximum possible motor speed (e.g. 20 times the standard audio CD speed, or approximately 10,000 rpm) if $T_1$ is not more than $Ref_1$, and at 40 percent of the maximum possible motor speed If $TE_1$ is more than $Ref_1$. Variable second check speeds are preferred to a fixed second check speed because overly eccentric disks might develop too much vibration when driven at the fixed speed.

Then the eccentricity of the disk is measured again at the second check speed according to the block $S_4$. The second eccentricity check is also done by the amplitude detector circuit 70, and the second eccentricity measurement $TE_2$ is written on the second part 73*b* of the memory 73.

Then the difference $E_1$ between the two eccentricity measurements $TE_1$ and $TE_2$ is computed according to the block $S_6$. This difference $E_1$ represents as aforesaid the hole eccentricity of the disk.

Then a maximum allowable speed of rotation for the particular disk 4, now on the drive spindle 16, is determined at the block $S_6$ on the basis of the hole eccentricity $E_1$ ascertained as above. The thus determined maximum allowable disk speed is retained on the RAM 56 until the disk is ejected. With the disk eccentricity check routine completed at $S_7$, the disk is read thereafter at a speed not exceeding the maximum allowable speed.

The determination of a maximum allowable speed for each disk on the bases of eccentricity measurements at two different check speeds according to the invention may be theoretically explained as follows: The tracking servo signal normally contains both a component TEa due to disk vibration by the FIG. 6 hole eccentricity of the disk and a component TEb due to the FIG. 7 track eccentricity of the disk. However, if the first disk check speed is sufficiently low to cause practically no disk vibration, the first eccentricity measurement $TE_1$ approximately equals the track eccentricity component TEb.

$$TE_1=TEb$$

If the second disk check speed is sufficiently high to cause disk vibration, the second eccentricity measurement $TE_2$ can be defined as:

$$TE_2=TEa+TEb.$$

Since the present invention teaches to set a read speed for each disk according to the difference $E_1$ between the two eccentricity measurements $TE_1$ and $TE_2$, as in the block $S_5$ of the FIG. 8 flowchart, $$E_1=TE_2-TE_1=TEa+TEb-TEb=TEa.$$

In other words, to compute the difference $E_1$ is to ascertain the hole eccentricity TEa of the disk.

Possibly, the first eccentricity measurement $TE_1$ may include a vibration component due to the FIG. 6 hole eccentricity. The track eccentricity component is the same, however, for both first and second eccentricity measurements $TE_1$ and $TE_2$, so that the subtraction of $TE_1$ from $TE_2$ will eliminate the track eccentricity component and yield only the hole eccentricity component.

It is the hole eccentricity of each disk that needs accurate measurement to anticipate its vibration during high speed rotation. The present invention meets this requirement by eliminating the track eccentricity component and relying only on the hole eccentricity to determine the optimum read speed for each disk.

This embodiment of the invention gains the following additional advantages:

1. Disk eccentricity is measured using no vibration sensors or equivalent means.
2. As the optimum read speed for each disk is determined preparatory to data recovery therefrom, the disk will not vibrate to such an extent as to bring about read errors through tracking errors and focusing errors. A reading of poor quality disks at the maximum motor speed would inevitably cause read errors and retries, increasing the time for reading a unit amount of data. Less errors will occur when a poor quality disk is read at a lower speed that suits the particular hole eccentricity of that disk; indeed, errors will occur so much less that a much shorter read time will be required than when the disk is read at a higher speed.
3. The tracking servo coil and focusing servo coils are kept from destruction with the reduction of disk vibration.
4. The driving of a low quality disk at a reduced speed causes less vibration of the disk, of the disk drive, and of other device such as an HDD.
5. The two disk eccentricity check speeds are both less than the maximum possible speed of the disk drive motor, so that the eccentricity check routine of FIG. 8 can be carried out while the motor is being energized toward its maximum speed prior to the commencement of data recovery from the disk that has been just loaded.

Second Form

The hole eccentricity of each disk is detected from the tracking error signal in the foregoing embodiment. The tracking error signal may, however, be of such low magnitude that it may be difficult to derive the eccentricity component solely from the tracking error signal in the case of disks that are only very slightly hole eccentric. Thus, in an alternate embodiment of the invention shown in FIGS. 9 and 10, disk eccentricity is detected from the drive signal for the moving coil 35, FIG. 2, of the tracking actuator 28 when the tracking error signal is of low level.

Generally, even disks that are infinitesimally eccentric may develop inconveniently great vibration when driven at a speed as high as from twenty to thirty times the standard audio CD speed. Fairly large disk eccentricities are accurately detectable from the tracking error signal. Infinitesimal disk eccentricities are not necessarily so, because then the tracking error signal is so small in amplitude. The tracking actuator drive signal is of much greater voltage magnitude than the tracking error signal, so that the eccentricity component is far more accurately detectable from the former than from the latter. From these considerations the alternate CD-ROM drive includes means for detecting disk eccentricity from the tracking actuator drive signal in addition to those from the tracking error signal.

Figure 9:
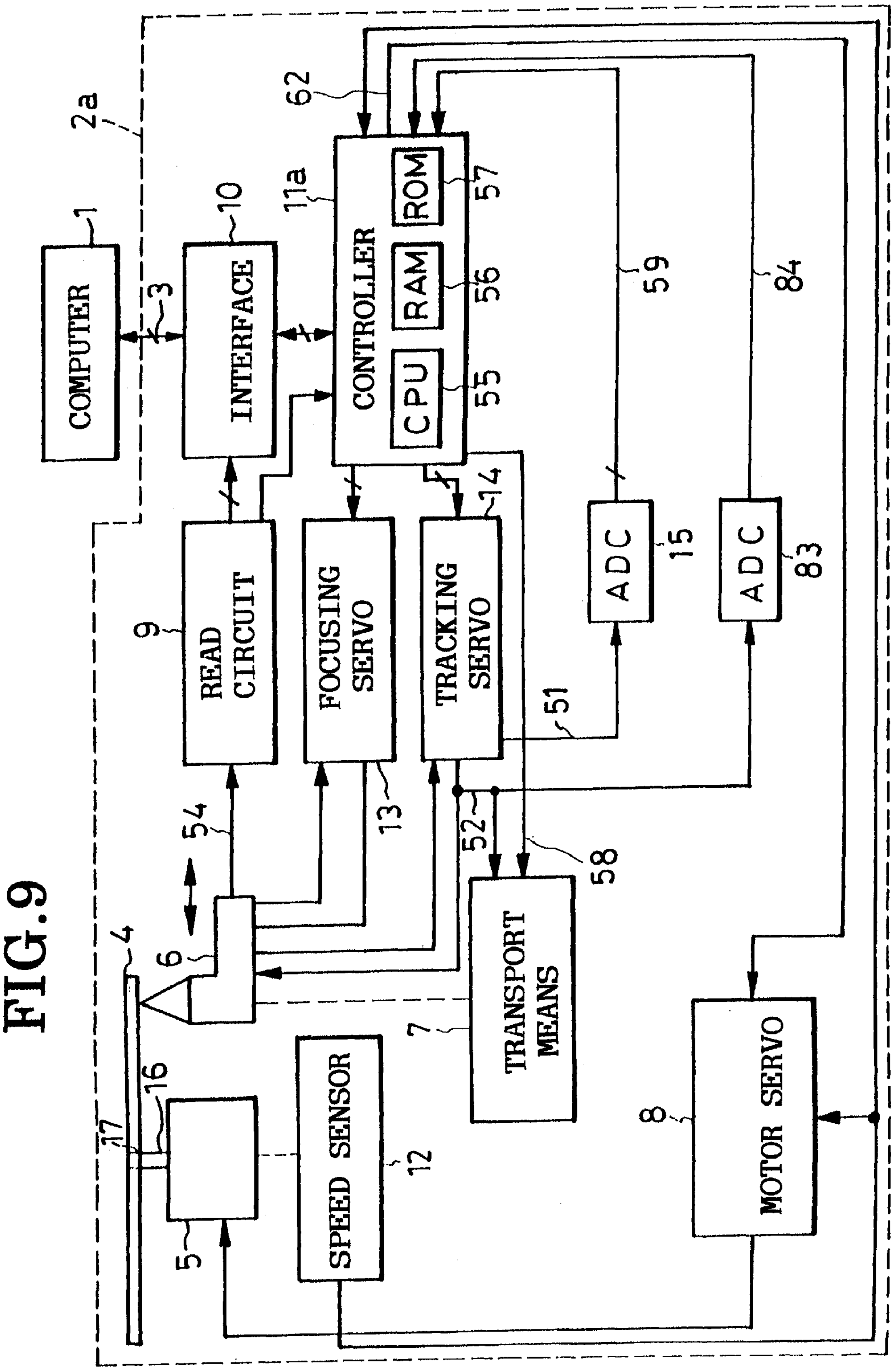
FIG. 9 is a block diagram of another preferred form of CD-ROM drive according to the invention.
Figure 10:
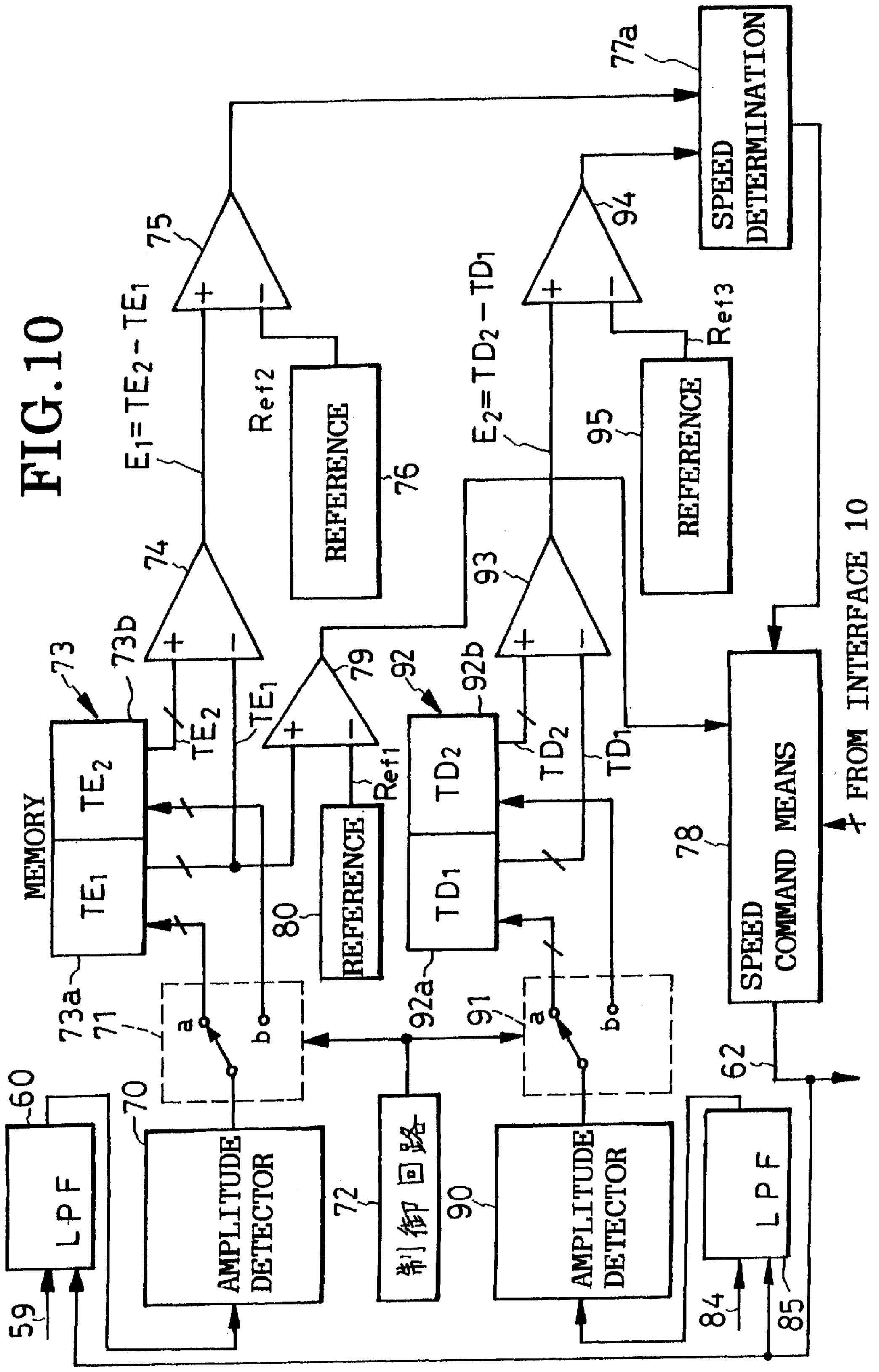
FIG. 10 is an equivalent block diagram of the system controller included in the FIG. 9 CD-ROM drive, showing in particular the means possessed by the controller for implementation of a modified disk eccentricity check method according to the invention.

In the alternate CD-ROM drive 2*a* shown in FIG. 9 the output conductor 52 of the tracking servo circuit 14 is connected to a second ADC 83 (the first ADC being seen at 15) and thence to a system controller 11*a* by way of a conductor 84. It will be recalled that the first ADC 15 is for digitizing the tracking error signal prior to delivery to the system controller. The second ADC 83, then, digitizes the drive signal for the moving coil 35, FIG. 2, of the tracking actuator 28 preliminary to application to the system controller 11*a*, which is correspondingly modified from the FIG. 3 controller 11 as shown in FIG. 10. The alternate disk drive 2*a* is akin to the FIG. 1 device 2 in all the other details of construction.

With reference to FIG. 10 the modified system controller 11*a* includes a second digital LPF 85 connected to the second ADC 83 by way of the conductor 84. Similar in construction to the first LPF 60, shown in detail in FIG. 4, the second LPF 85 functions to derive from the tracking actuator drive signal the component representative of the hole eccentricity of the disk.

In order to ascertain the hole eccentricity from the tracking actuator drive circuit the system controller 11*a* is shown in FIG. 10 as comprising, in addition to the second LPF 85, a second amplitude detector circuit 90, a second selector switch 91, a second memory 92, a second subtracter 93, a second comparator 94, and second reference means 95. The means for detecting the hole eccentricity from the tracking error signal, also included in the system controller 11*a*, are of the same construction as in FIG. 3, so that their components are therefore identified by the same reference characters as used to denote their FIG. 3 counterparts. Furthermore the system controller 11*a* includes speed determination means 77*a* to which there are input the hole eccentricities as detected from both the tracking error signal and the tracking actuator drive signal.

Connected to the second LPF 85, the second amplitude detector circuit 90 detects the amplitude of the eccentricity component of the tracking actuator drive signal. The second selector switch 91 is controlled jointly with the first selector switch 71 by the switch control circuit for directing the amplitude detector output (first eccentricity measurement) $TD_1$ at the first disk check speed into the first part 92*a* of the second memory 92, and the amplitude detector output (second eccentricity measurement) $TD_2$ at the second check speed into the second memory part 92*b*.

The eccentricity measurements $TD_1$ and $TD_2$ derived from the tracking actuator drive signal are akin to the eccentricity measurements $TE_1$ and $TE_2$ made from the tracking error signal. The first measurement $TD_1$ mostly represents the FIG. 7 track eccentricity of the disk whereas the second measurement $TD_2$ represents both FIG. 6 hole eccentricity and FIG. 7 track eccentricity. Consequently, a subtraction of $TD_1$ from $TD_2$ provides the hole eccentricity $E_2$ of the disk. Possibly, like the first measurement $TE_1$ of the tracking error signal, the first measurement $TD_1$ of the tracking actuator drive signal may also contain a hole eccentricity component. Both measurements $TD_1$ and $TD_2$ contain the same amount of track eccentricity component, however, so that the difference $E_2$ therebetween is free from the track eccentricity component.

The second subtracter 93 has its two inputs coupled to the two memory parts 92*a* and 92*b* for computing the difference $E_2$ between the two eccentricity measurements $TD_1$ and $TD_2$. The second comparator 94 compares the difference $E_2$ with a reference $Ref_3$ and provides a signal indicative of the results of the comparison.

Inputting the outputs from both first and second comparators 75 and 94, the speed determination means 77*a* determines the disk speed as follows:

1. If the difference $E_1$ is equal to or greater than the reference $Ref_2$, the disk is of great hole eccentricity, so that a relatively low first speed $N_1$ (e.g. not more than four times the standard audio CD speed) is set for the disk.
2. If the difference $E_1$ is less than the reference $Ref_2$, and the other difference $E_2$ equal to or greater than the reference Ref, the disk is of medium hole eccentricity, so that a higher second speed $N_1$ (e.g. from five to sixteen times the standard audio DC speed) is set for the disk.
3. If the difference $E_1$ is less than the reference $Ref_2$, and the other difference $E_2$ less than the reference $Ref_3$, the disk is of minimal hole eccentricity, so that a third speed $N_3$ of the highest possible disk drive motor speed (e.g. from seventeen to thirty times the standard audio CD speed) is set for the disk.

The disk speed $N_1$, $N_2$ or $N_3$ determined as above is sent from speed determination means 77*a* to speed command means 78 whereupon the latter signals the motor servo circuit 8, FIG. 9, to rotate the disk at the required speed for reading. The disk will be read with a minimum of vibration whatever its hole eccentricity may be.

The eccentricity check method implemented in the FIGS. 9 and 10 disk drive is substantially analogous with that of the preceding embodiment and therefore as analogously represented by the FIG. 8 flowchart. The two eccentricity measurements from the tracking actuator drive signal are made concurrently with those from the tracking error signal at the blocks $S_2$ and $S_4$.

Besides gaining all the advantages set forth in connection with the first disclosed embodiment, this second embodiment offers the strength of far more accurately detecting minute disk eccentricities from the tracking actuator drive signal than from the tracking error signal.

Third Form

Figure 11:
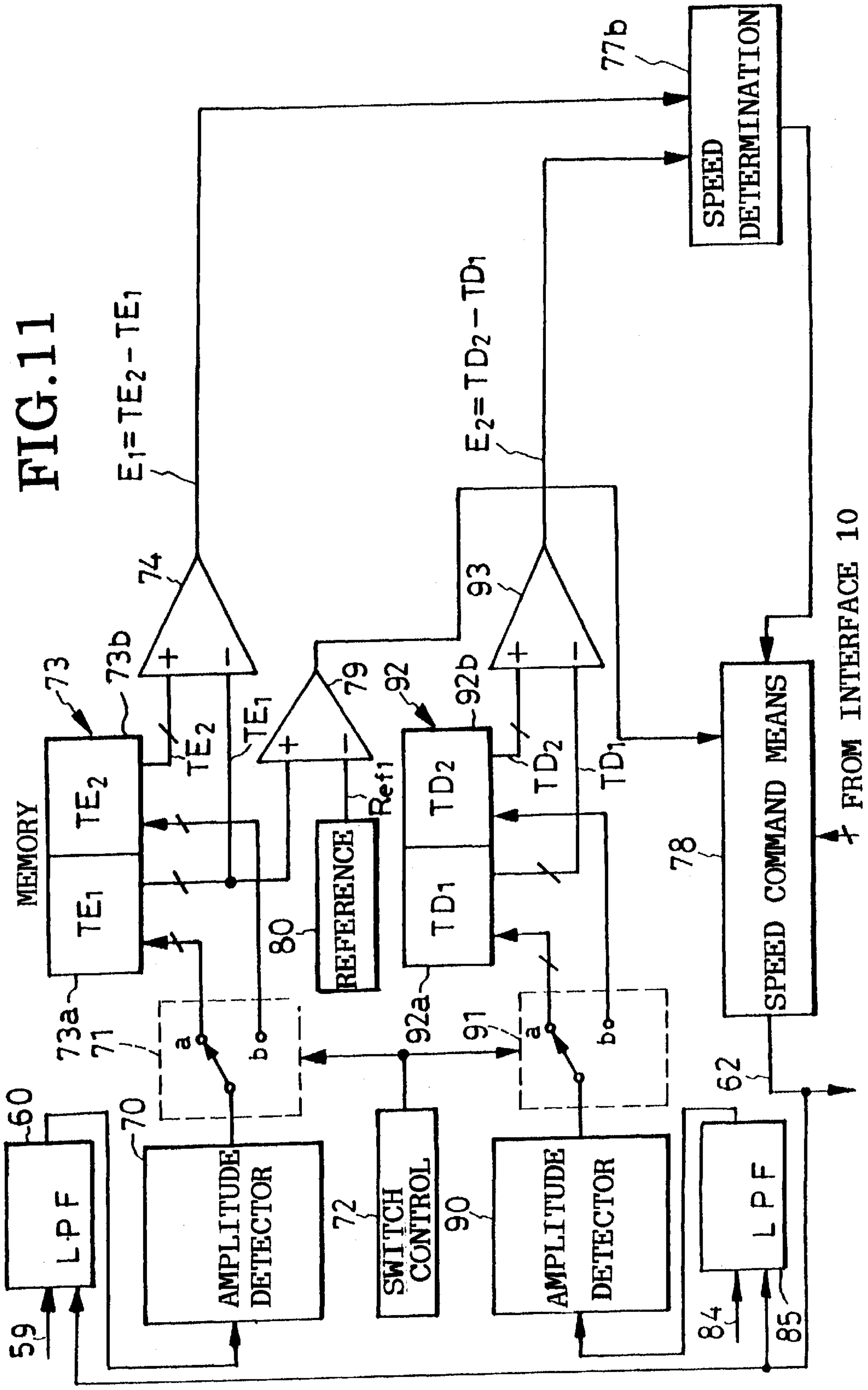
FIG. 11 is an equivalent block diagram of a system controller for use in the FIG. 9 CD-ROM drive in substitution for the FIG. 10 system controller, showing in particular the means possessed by this alternate controller for implementation of another modified disk eccentricity check method according to the invention.

Shown in FIG. 11 is a slight modification of the FIG. 10 system controller. The FIG. 11 system controller differs from that of FIG. 10 in having no comparators 75 and 94 and no reference means 76 and 95 and in having, instead, a modified speed determination means 77*b*. The two subtracters 74 and 93 are therefore coupled directly to the modified speed determination means 77*b*.

Inputting both difference $E_1$ between the eccentricity measurements $TE_1$ and $TE_2$ made from the tracking error signal and difference $E_2$ between the eccentricity measurements $TD_1$ and $TD_2$ made from the tracking actuator drive signal, the speed determination means 77*b* computes the equation, $E_3=aE_1+E_2$, where a is a correction coefficient, and determines the quality of the disk and the fitting speed therefor according to whether the sum $E_3$ is greater than a reference or not. The disk is of large hole eccentricity if $E_3$ is greater than the reference, so that a relatively low speed is chosen for the disk. If $E_3$ is not more than the reference, on the other hand, then the disk is of small hole eccentricity, so that the disk is read at the maximum motor speed.

Fourth Form

Figure 12:
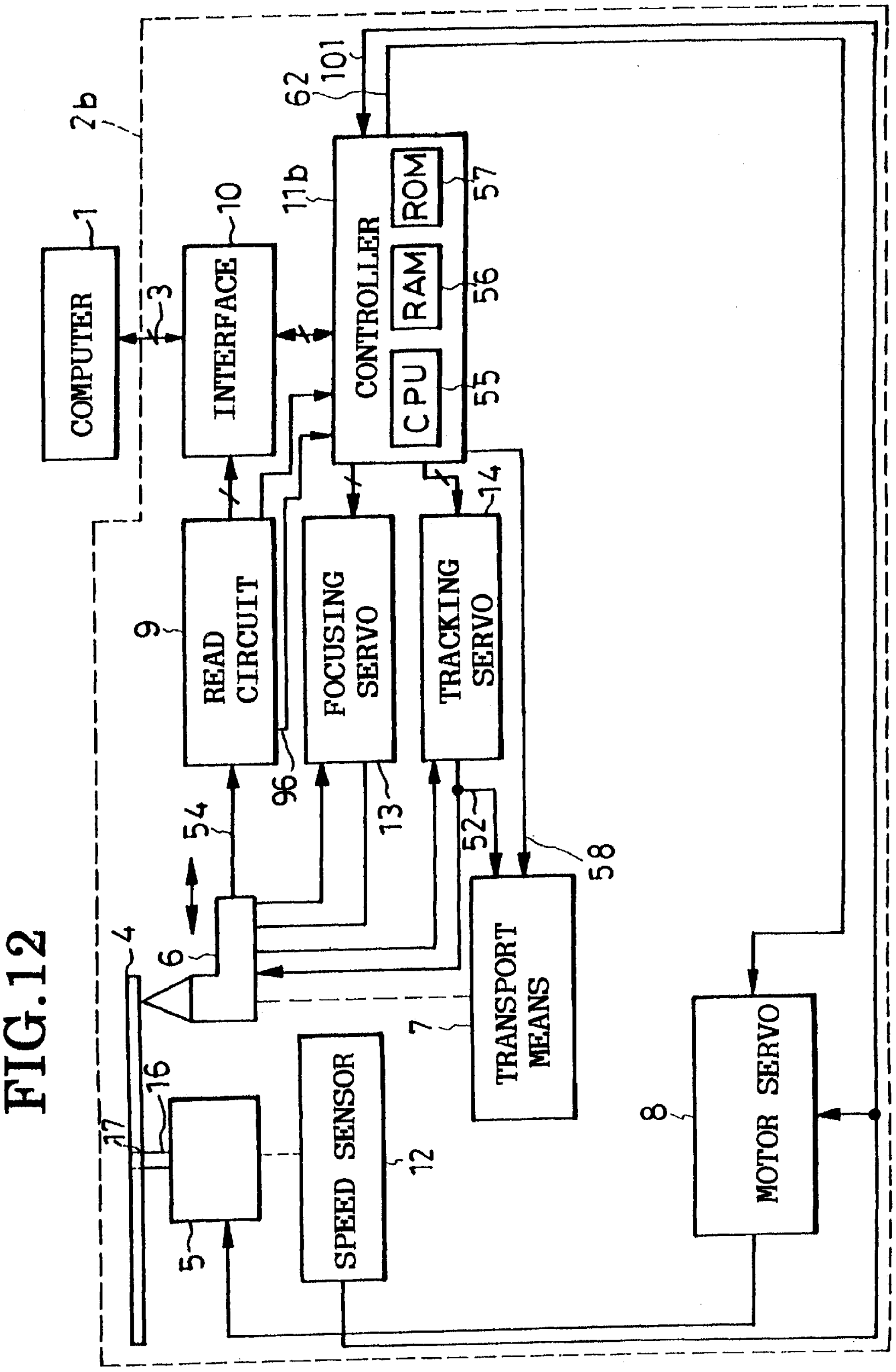
FIG. 12 is a block diagram of a yet another preferred form of CD-ROM drive according to the invention.
Figure 13:
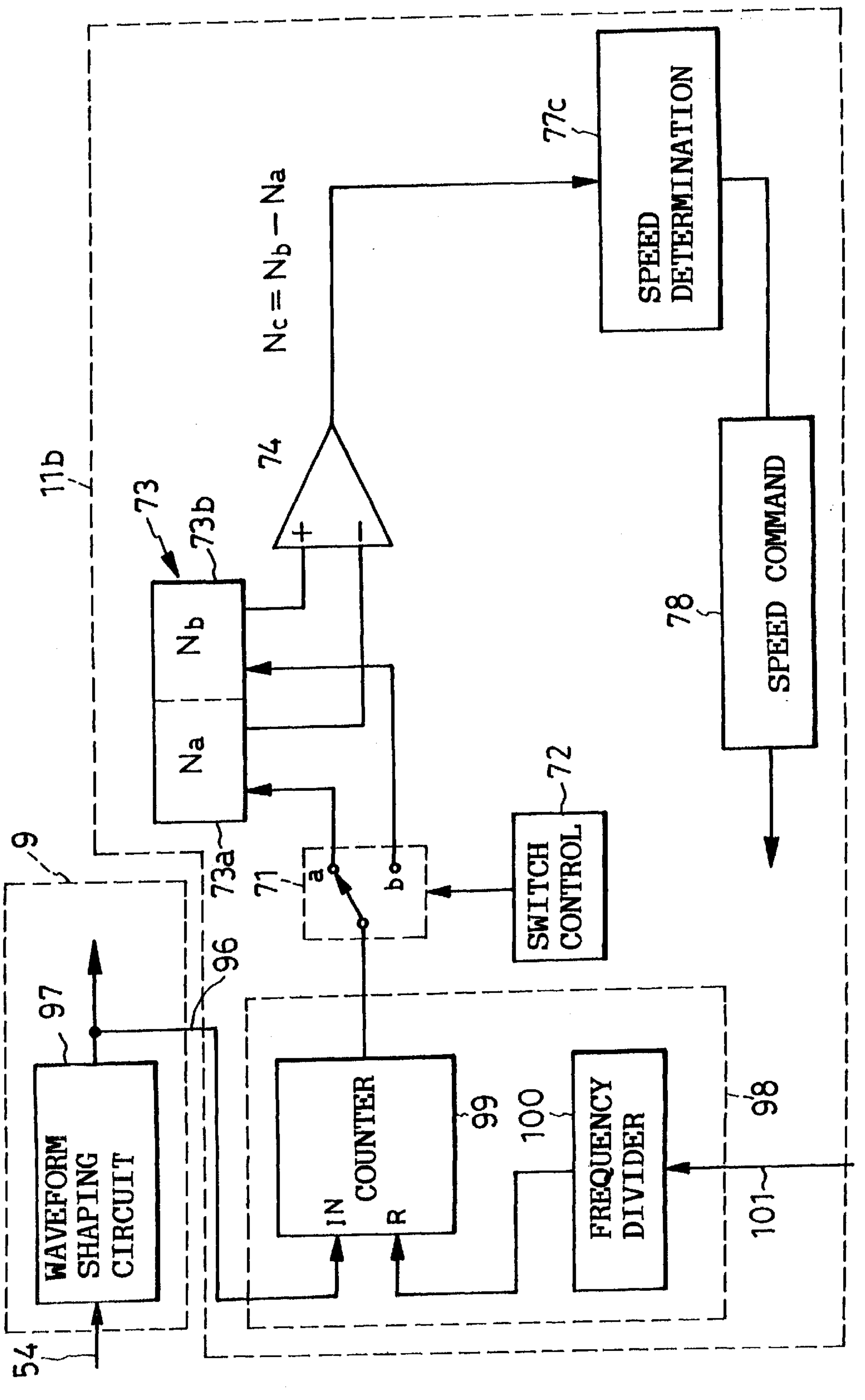
FIG. 13 is an equivalent block diagram of the read circuit and the system controller included in the FIG. 12 CD-ROM drive, showing in particular the means possessed by the read circuit and the system controller for implementation of a further modified disk eccentricity check method according to the invention.

In the CD-ROM drive 2*b* shown in FIG. 12, the disk eccentricity is measured on the basis of the number of track turns traversed by the read beam spot 34, FIG. 2, during each complete revolution of the disk, with the tracking servo turned off during such eccentricity measurement. Thus the disk drive 2*b* has neither the ADC 15 of the FIG. 1 disk drive 1 nor the ADC 83 of the FIG. 9 disk drive 2*a*; instead, as shown in FIG. 13, the wave shaping circuit 97 customarily included in the read circuit 9 is connected by way of a conductor 96 to a modified system controller 11*b* detailed in the same figure. Connected to the output conductor of the transducer 6, the wave shaping circuit 97 operates to reshape the transducer output into a rectangular waveform.

The modified system controller 11*b* has eccentricity detector means 98 in substitution for the LPF 60 and amplitude detector circuit 70 of the FIG. 3 system controller. The eccentricity detector means 98 is shown as comprising a counter 99 having an Input IN connected to the wave shaping circuit 97, and a frequency divider 100 connected to the reset input R of the counter. Reset by an output pulse of the frequency divider 100 when the apparatus is in eccentricity check mode, the counter 99 counts the pulses from the wave shaping circuit 97.

The frequency divider 100 is connected to the disk drive motor speed sensor 12, FIG. 12 by way of a conductor 101. It is understood that the speed sensor 12 is of conventional make capable of producing Six pulses with each complete revolution of the disk 4. The frequency divider 100 puts out a pulse each time it inputs six pulses from the speed sensor 12; in other words, it puts out a pulse with each complete revolution of the disk. Thus the counter 99 counts the pulses incoming from the wave shaping circuit 97 during each complete revolution of the disk.

The focusing servo of the disk drive 2*b* is set in operation by closing the focusing servo switch 41, FIG. 2, and the tracking servo is set out of operation by opening the tracking servo switch 46, for disk eccentricity check according to the invention. When the disk is read under these conditions, the wave shaping circuit 97 will produce a pulse each time the read beam spot traverses the track 18. The beam spot will cross the track only once for each complete disk revolution in the case of a noneccentric disk. If the disk has some FIG. 6 hole eccentricity, however, the beam spot will cross the track more than once by reasons of disk vibration and beam spot displacement radially of the disk. The beam spot will cross the track more than once if the disk is track eccentric as in FIG. 7, too.

Thus the number of times the beam spot crosses the track per unit length of time is a measure of disk eccentricity. It will therefore be apparent that the output pulses of the wave shaping circuit 97 might be counted during any preset period of time other than that of each complete disk revolution.

In this FIGS. 12 and 13 embodiment, too, disk eccentricity is checked at two different speeds. In the FIG. 13 system controller 11*b*, therefore, the counter 99 is shown connected via the selector switch 71 to the two different parts 73*a* and 73*b* of the memory 73. The first eccentricity count Na is stored on the first memory part 73*a*, and the second eccentricity count Nb on the second memory part 73*b*. The subtracter subtracts the first eccentricity count Na from the second Nb and sends the difference Nc therebetween to speed determination means 77*c*. Like the two eccentricity measurements $TE_1$ and $T_2$ of the foregoing embodiments, the eccentricity counts Na and Nb contain information on the track and hole eccentricities of the disk, so that the difference Nc therebetween represents only the hole eccentricity of the disk.

Inputting the difference Nc, the speed determination means 77*c* determines the disk speed accordingly. For example, the disk speed may be set at the maximum motor speed (e.g. twenty times the standard audio CD speed) if Nc is not more than two, at 80 percent of the maximum motor speed (e.g. sixteen times the standard audio CD speed) if Nc is three, and at 50 percent of the maximum motor speed (e.g. ten times the standard audio CD speed) if Nc is four. Data recovery from the disk is then commenced at the chosen speed.

Figure 14:
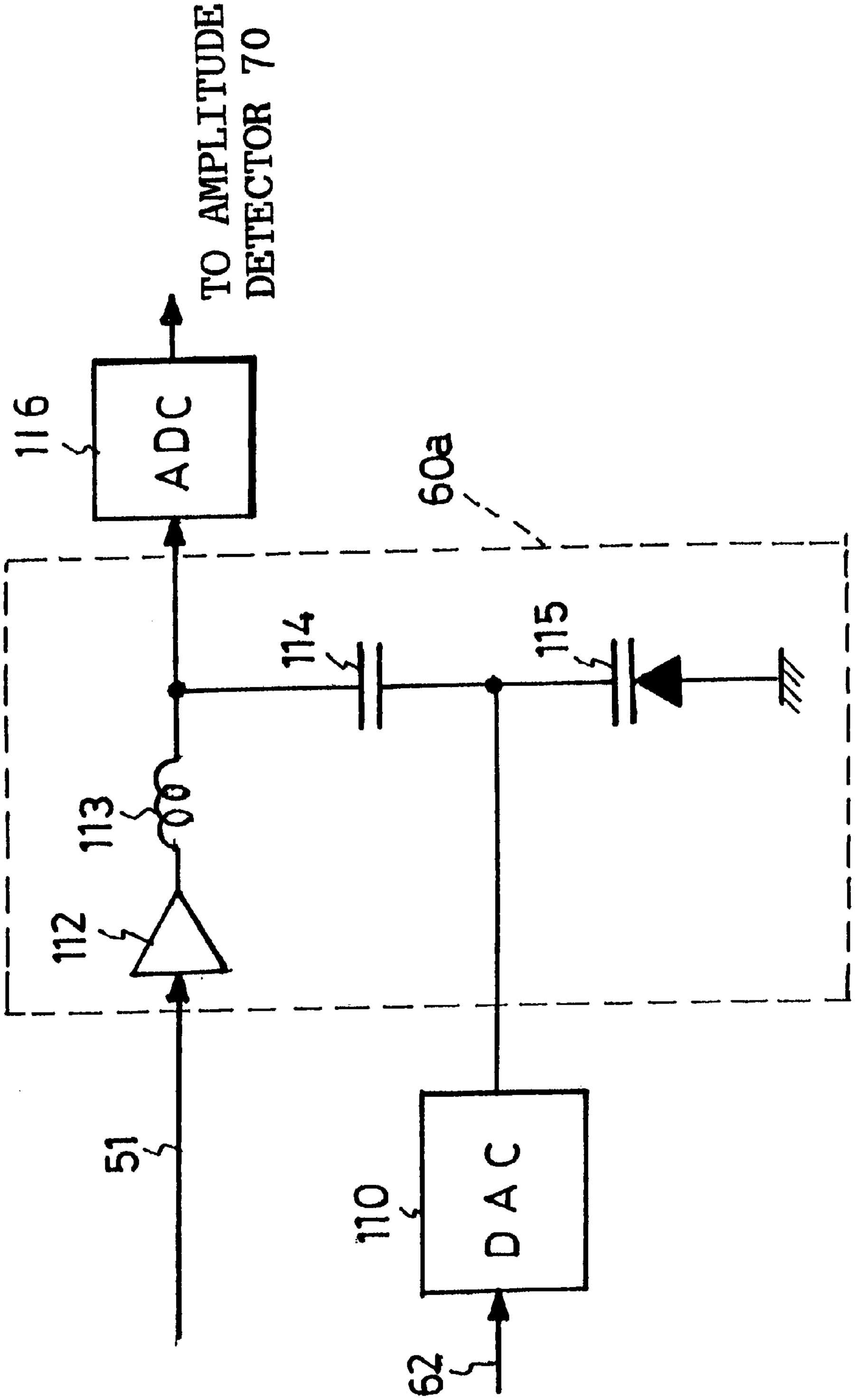
FIG. 14 is a schematic electrical diagram of an analog lowpass filter for use in place of digital lowpass filters used in the foregoing embodiments.

Notwithstanding the foregoing detailed disclosure it is not desired that the present invention be limited by the exact showing of the drawings or the description thereof; rather, the invention should be construed broadly and in a manner consistent with the fair meaning or proper scope of the attached claims. The following is a brief list of possible modifications of the illustrated embodiments which are all believed to fall within the scope of this invention:

1. The digital LPFs 60 and 85 could be replaced each by an analog LPF shown at 60*a* in FIG. 14, which comprises a buffer 112, an inductance (or resistor) 113, a capacitor 114 and a variable capacitance diode 115. The variable capacitance diode 115 is controlled by the analog voltage output from a digital to analog converter 110 on the output conductor 62 of the speed command means 78, FIGS. 3, 10 and 11. The output from the analog LPF 60*a* is directed through an ADC 116 to the amplitude detector circuit 70 or 90.
2. The invention could be applied to devices for CAV servo reading of CAV disks, and CAV reading of CLV disks. Incidentally, in the illustrated embodiments of the invention, it is understood that a radially inward region of the disk is read at CAV, and a radially outward region at CLV.
3. In the FIGS. 10 and 11 embodiments the hole eccentricity of each disk could be detected solely from the tracking actuator drive signal, instead of from both tracking actuator drive signal and tracking error signal.
4. The various hole eccentricity data supplied to the speed determination means in FIGS. 10, 11 and 13 could be employed in various other combinations for determination of the fitting speed for each disk.
5. The photodetector 26 could be split into two sections instead of six as in the illustrated embodiments.
6. The invention could be applied to not only optical, but also magnetic, disk drives.

What is claimed is:

1. In an apparatus for data recovery from rotating data storage disks having varying degrees of hole eccentricity and track eccentricity, a method of reading each disk at a speed suiting the particular hole eccentricity of that disk, which method comprises:

(a) driving a data storage disk at a first disk eccentricity check speed;

(b) making a first measurement of the hole eccentricity and track eccentricity of the disk in rotation at the first disk eccentricity check speed;

(c) driving the disk at a second disk eccentricity check speed which is higher than the first disk eccentricity check speed;

(d) making a second measurement of the hole eccentricity and track eccentricity of the disk in rotation at the second disk eccentricity check speed;

(e) ascertaining the hole eccentricity of the disk by subtracting the first measurement from the second measurement; and (f) determining a matching speed of rotation for reading the disk on the basis of the above ascertained hole eccentricity thereof.

2. In an apparatus for data recovery from rotating optical data storage disks having varying degrees of hole eccentricity and track eccentricity, the apparatus having a transducer for reading data recorded on each such disk along a track thereon by irradiating the disk with a beam of light, the hole eccentricity of each disk manifesting itself during disk rotation as periodic vibration of the disk and, in consequence, periodic departures of the light beam from the track to an extent proportional to the speed of disk rotation, the track eccentricity manifesting itself during disk rotation as periodic departures of the light beam from the track to a constant extent regardless of the speed of disk rotation, a method of reading each disk at a speed suiting the particular hole eccentricity of that disk, which method comprises:

(a) driving an optical data storage disk at a first disk eccentricity check speed;

(b) making a first measurement of the hole eccentricity and track eccentricity of the disk in rotation at the first disk eccentricity check speed in terms of the resulting periodic departures of the light beam from the track;

(c) driving the disk at a second disk eccentricity check speed which is higher than the first disk eccentricity check speed;

(d) making a second measurement of the hole eccentricity and track eccentricity of the disk in rotation at the second disk eccentricity check speed in terms of the resulting periodic departures of the light beam from the track;

(e) ascertaining the hole eccentricity of the disk by subtracting the first measurement from the second measurement; and (f) determining a matching speed of rotation for reading the disk on the basis of the above ascertained hole eccentricity thereof.

3. The method of claim 2 wherein the apparatus includes a tracking servo for holding the spot of the light beam on the track on the disk, the tracking servo including means for providing a tracking error signal representative of the departures of the beam spot from the track, and wherein the first and the second measurements of the hole eccentricity and track eccentricity of the disk are each made by:

(a) deriving from the tracking error signal a component that varies periodically with each complete revolution of the disk; and (b) detecting the amplitude of the derived component of the tracking error signal.

4. The method of claim 2 wherein the apparatus includes a tracking servo for holding the spot of the light beam on the track on the disk, the tracking servo including means for providing a tracking actuator drive signal for driving a tracking actuator so as to keep the beam spot on the track, and wherein the first and the second measurements of the hole eccentricity and track eccentricity of the disk are each made by:

(a) deriving from the tracking actuator drive signal a component that varies periodically with each complete revolution of the disk; and (b) detecting the amplitude of the derived component of the tracking actuator drive signal.

5. In an apparatus for data recovery from rotating optical data storage disks having varying degrees of hole eccentricity and track eccentricity, the apparatus having a transducer for reading data recorded on each such disk along a track thereon by irradiating the disk with a beam of light, the hole eccentricity of each disk manifesting itself during disk rotation as periodic vibration of the disk and, in consequence, periodic departures of the light beam from the track to an extent proportional to the speed of disk rotation, the track eccentricity manifesting itself during disk rotation as periodic departures of the light beam from the track to a constant extent regardless of the speed of disk rotation, the apparatus further including a tracking servo for holding the spot of the light beam on the track on the disk, the tracking servo including means for providing a tracking error signal representative of the departure of the beam spot from the track, and means responsive to the tracking error signal for providing a tracking actuator drive signal for driving a tracking actuator so as to keep the beam spot on the track, a method of reading each disk at a speed suiting the particular hole eccentricity of that disk, which method comprises:

(a) driving an optical data storage disk at a first disk eccentricity check speed;

(b) making a first measurement of the hole eccentricity and track eccentricity of the disk in rotation at the first disk eccentricity check speed by deriving from the tracking error signal a component that varies periodically with each complete revolution of the disk and by detecting the amplitude of the derived component of the tracking error signal;

(c) concurrently with step (b), making a second measurement of the hole eccentricity and track eccentricity of the disk in rotation at the first disk eccentricity check speed by deriving from the tracking actuator drive signal a component that varies periodically with each complete revolution of the disk and by detecting the amplitude of the derived component of the tracking actuator drive signal;

(d) driving the disk at a second disk eccentricity check speed which is higher than the first disk eccentricity check speed;

(e) making a third measurement of the hole eccentricity and track eccentricity of the disk in rotation at the second disk eccentricity check speed by deriving from the tracking error signal a component that varies periodically with each complete revolution of the disk and by detecting the amplitude of the derived component of the tracking error signal;

(f) concurrently with step (e), making a fourth measurement of the hole eccentricity and track eccentricity of the disk in rotation at the second disk eccentricity check speed by deriving from the tracking actuator drive signal a component that varies periodically with each complete revolution of the disk and by detecting the amplitude of the derived component of the tracking actuator drive signal;

(g) subtracting the first measurement from the third measurement;

(h) subtracting the second measurement from the fourth measurement; and (i) determining a matching speed of rotation for reading the disk on the bases of the remainders of subtraction of the first measurement from the third measurement and of subtraction of the second measurement from the fourth measurement.

6. The method of claim 5 wherein the speed of rotation for reading the disk is set at a first value when the remainder of subtraction of the first measurement from the third measurement is equal to or greater than a first reference, at a second value, which is higher than the first value, when the remainder of subtraction of the first measurement from the third measurement is less than the first reference and, at the same time, the remainder of subtraction of the second measurement from the fourth measurement is equal to or greater than a second reference, and at a third value, which is higher than the second value, when the remainder of subtraction of the first measurement from the third measurement is less than the first reference and, at the same time, the remainder of subtraction of the second measurement from the fourth measurement is less than the second reference.

7. The method of claim 5 wherein the speed of rotation for reading the disk is determined according to the sum of the remainders of subtraction of the first measurement from the third measurement and of subtraction of the second measurement from the fourth measurement.

8. In an apparatus for data recovery from rotating optical data storage disks having varying degrees of hole eccentricity and track eccentricity, the apparatus having a transducer for reading data recorded on each such disk along a track thereon by irradiating the disk with a beam of light, and a tracking servo for holding the spot of the light beam on the track on the disk, a method of reading each disk at a speed suiting the particular hole eccentricity of that disk, which method comprises:

(a) turning the tracking servo off;

(b) driving an optical data storage disk at a first disk eccentricity check speed;

(c) making a first measurement of the hole eccentricity and track eccentricity of the disk in rotation at the first disk eccentricity check speed in terms of the number of times the light beam crosses the track during at least one complete revolution of the disk;

(d) driving the disk at a second disk eccentricity check speed which is higher than the first disk eccentricity check speed;

(e) making a second measurement of the hole eccentricity and track eccentricity of the disk in rotation at the second disk eccentricity check speed in terms of the number of times the light beam crosses the track during at least one complete revolution of the disk;

(f) ascertaining the hole eccentricity of the disk by subtracting the number of times the light beam crossed the track at the first eccentricity measurement from the number of times the light beam crossed the track at the second eccentricity measurement; and (g) determining a matching speed of rotation for reading the disk on the basis of the above ascertained hole eccentricity thereof.

9. The method of claim 8 wherein the first and the second measurements of the hole eccentricity and track eccentricity of the disk are each made by counting output pulses of the transducer.

10. An apparatus for data recovery from rotating data storage disks having varying degrees of hole eccentricity and track eccentricity, wherein the improvement resides in the combination of:

(a) drive means for imparting variable speed rotation to a data storage disk;

(b) speed command means connected to the drive means for commanding speeds at which the disk is to be rotated, the speed command means being capable of commanding disk rotation at a first and a second disk eccentricity check speed, the first disk eccentricity check speed being lower than the second disk eccentricity check speed;

(c) eccentricity measurement means for making a first measurement of the hole eccentricity and track eccentricity of the disk in rotation at the first disk eccentricity check speed, and a second measurement of the hole eccentricity and track eccentricity of the disk in rotation at the second disk eccentricity check speed;

(d) subtracter means connected to the eccentricity measurement means for ascertaining the hole eccentricity of the disk by subtracting the first measurement from the second measurement; and (e) speed determination means connected between the subtracter means and the speed command means for determining a matching speed of rotation for reading the disk on the basis of the above ascertained hole eccentricity thereof.

11. An apparatus for data recovery from rotating optical data storage disks having varying degrees of hole eccentricity and track eccentricity, the apparatus having a transducer for reading data recorded on each such disk along a track thereon by irradiating the disk with a beam of light, the hole eccentricity of each disk manifesting itself during disk rotation as periodic vibration of the disk and, in consequence, periodic departures of the light beam from the track to an extent proportional to the speed of disk rotation, the track eccentricity manifesting itself during disk rotation as periodic departures of the light beam from the track to a constant extent regardless of the speed of disk rotation, wherein the improvement resides in the combination thereof with:

(a) drive means for imparting variable speed rotation to an optical data storage disk;

(b) speed command means connected to the drive means for commanding speeds at which the disk is to be rotated, the speed command means being capable of commanding disk rotation at a first and a second disk eccentricity check speed, the first disk eccentricity check speed being lower than the second disk eccentricity check speed;

(c) eccentricity measurement means for making a first measurement of the hole eccentricity and track eccentricity of the disk in rotation at the first disk eccentricity check speed, and a second measurement of the hole eccentricity and track eccentricity of the disk in rotation at the second disk eccentricity check speed, both in terms of the resulting periodic departures of the light beam from the track;

(d) subtracter means connected to the eccentricity measurement means for ascertaining the hole eccentricity of the disk by subtracting the first measurement from the second measurement; and (e) speed determination means connected between the subtracter means and the speed command means for determining a matching speed of rotation for reading the disk on the basis of the above ascertained hole eccentricity thereof.

12. The apparatus of claim 11 wherein the apparatus has a tracking servo for holding the spot of the light beam on the track on the disk, the tracking servo including means for providing a tracking error signal representative of the departures of the beam spot from the track, and wherein the eccentricity measurement means comprises:

(a) means for deriving from the tracking error signal a component that varies periodically with each complete revolution of the disk; and (b) means for detecting the amplitude of the derived component of the tracking error signal.

13. The apparatus of claim 11 wherein the apparatus has a tracking servo for holding the spot of the light beam on the track on the disk, the tracking servo including means for providing a tracking actuator drive signal for driving a tracking actuator so as to keep the beam spot on the disk, and wherein the eccentricity measurement means comprises:

(a) means for deriving from the tracking actuator drive signal a component that varies periodically with each complete revolution of the disk; and (b) means for detecting the amplitude of the derived component of the tracking actuator drive signal.

14. An apparatus for data recovery from rotating optical data storage disks having varying degrees of hole eccentricity and track eccentricity, the apparatus having a transducer for reading data recorded on each such disk along a track thereon by irradiating the disk with a beam of light, the hole eccentricity of each disk manifesting itself during disk rotation as periodic vibration of the disk and, in consequence, periodic departures of the light beam from the track to an extent proportional to the speed of disk rotation, the track eccentricity manifesting itself during disk rotation as periodic departures of the light beam from the track to a constant extent regardless of the speed of disk rotation, the apparatus further having a tracking servo for holding the spot of the light beam on the track on the disk, the tracking servo including means for providing a tracking error signal representative of the departure of the beam spot from the track, and means responsive to the tracking error signal for providing a tracking actuator drive signal for driving a tracking actuator so as to keep the beam spot on the track, wherein the improvement resides in the combination thereof with:

(a) drive means for imparting variable speed rotation to an optical data storage disk;

(b) speed command means connected to the drive means for commanding speeds at which the disk is to be rotated, the speed command means being capable of commanding disk rotation at a first and a second disk eccentricity check speed, the first disk eccentricity check speed being lower than the second disk eccentricity check speed;

(c) first eccentricity measurement means for making a first measurement of the hole eccentricity and track eccentricity of the disk in rotation at the first disk eccentricity check speed, and a second measurement of the hole eccentricity and track eccentricity of the disk in rotation at the second disk eccentricity check speed, both by deriving from the tracking error signal a component that varies periodically with each complete revolution of the disk and by detecting the amplitude of the derived component of the tracking error signal;

(d) second eccentricity measurement means for making a third measurement of the hole eccentricity and track eccentricity of the disk in rotation at the first disk eccentricity check speed, and a fourth measurement of the hole eccentricity and track eccentricity of the disk in rotation at the second disk eccentricity check speed, both by deriving from the tracking actuator drive signal a component that varies periodically with each complete revolution of the disk and by detecting the amplitude of the derived component of the tracking actuator drive signal;

(e) first subtracter means connected to the first eccentricity measurement means for subtracting the first measurement from the second measurement;

(f) second subtracter means connected to the second eccentricity measurement means for subtracting the third measurement from the fourth measurement; and (e) speed determination means connected between the first and the second subtracter means and the speed command means for determining a matching speed of rotation for reading the disk on the bases of the remainders of subtraction of the first measurement from the second measurement and of subtraction of the third measurement from the fourth measurement.

15. The apparatus of claim 14 wherein the speed determination means determines the speed of rotation for reading the disk at a first value when the remainder of subtraction of the first measurement from the second measurement is equal to or greater than a first reference, at a second value, which is higher than the first value, when the remainder of subtraction of the first measurement from the second measurement is less than the first reference and, at the same time, the remainder of subtraction of the third measurement from the fourth measurement is equal to or greater than a second reference, and at a third value, which is higher than the second value, when the remainder of subtraction of the first measurement from the second measurement is less than the first reference and, at the same time, the remainder of subtraction of the third measurement from the fourth measurement is less than the second reference.

16. The apparatus of claim 14 wherein the speed determination means determines the speed of rotation for reading the disk according to the sum of the remainders of subtraction of the first measurement from the second measurement and of subtraction of the third measurement from the fourth measurement.

17. An apparatus for data recovery from rotating optical data storage disks having varying degrees of hole eccentricity and track eccentricity, the apparatus having a transducer for reading data recorded on each such disk along a track thereon by irradiating the disk with a beam of light, and a tracking servo for holding the spot of the light beam on the track on the disk, a method of reading each disk at a speed suiting the particular hole eccentricity of that disk, which method comprises:

(a) drive means for imparting variable speed rotation to an optical data storage disk;

(b) speed command means connected to the drive means for commanding speeds at which the disk is to be rotated, the speed command means being capable of commanding disk rotation at a first and a second disk eccentricity check speed, the first disk eccentricity check speed being lower than the second disk eccentricity check speed;

(c) means for turning the tracking servo on and off;

(d) eccentricity measurement means for making a first measurement of the hole eccentricity and track eccentricity of the disk in rotation at the first disk eccentricity check speed, and a second measurement of the hole eccentricity and track eccentricity of the disk in rotation at the second disk eccentricity check speed, both with the tracking servo turned off, and both in terms of the number of times the light beam crosses the track during at least one complete revolution of the disk at each check speed;

(e) subtracter means connected to the eccentricity measurement means for ascertaining the hole eccentricity of the disk by subtracting the number of times the light beam crossed the track at the first eccentricity measurement from the number of times the light beam crossed the track at the second eccentricity measurement; and (f) speed determination means connected between the subtracter means and the speed command means for determining a matching speed of rotation for reading the disk on the basis of the above ascertained hole eccentricity thereof.

18. The apparatus of claim 17 wherein the eccentricity measurement means include a counter for making the first and the second measurements of the hole eccentricity and track eccentricity of the disk by counting output pulses of the transducer.

* * * * *

UNITED STATES PATENT AND TRADEMARK OFFICE

CERTIFICATE OF CORRECTION

PATENT NO. : 6,181,652 B1
DATED : January 30, 2001
INVENTOR(S) : Katou et al.

It is certified that error appears in the above-identified patent and that said Letters Patent is hereby corrected as shown below:

Column 4,
Line 2, please delete "In" and insert therefor -- in --.
Line 19, please delete "ac5cording" and insert therefor -- according --.

Column 5,
Line 38, please delete "Is" and insert therefor -- is --.
Line 39, please delete "Illustrated" and insert therefor -- illustrated --.

Column 6,
Line 47, after "E" please insert -- . --.

Column 8,
Line 45, please delete "conduc3" and insert therefor -- conductor --.

Column 10,
Line 67, please delete "Input" and insert therefor -- input --.

Column 11,
Line 15, please delete "Inmost" and insert therefor -- inmost --.
Line 35, please delete "If" and insert therefor -- if --.

Column 14,
Line 29, please delete "Ref" and insert therefor -- $Ref_3$ --.

Column 15,
Line 31, please delete "Input" and insert therefor -- input --.

Signed and Sealed this

Sixteenth Day of October, 2001

*Attest:*

Nicholas P. Godici

NICHOLAS P. GODICI

*Attesting Officer* *Acting Director of the United States Patent and Trademark Office*